(12) United States Patent
Han et al.

(10) Patent No.: US 11,381,819 B2
(45) Date of Patent: Jul. 5, 2022

(54) CHROMA DELTA QUANTIZATION PARAMETER (QP) IN VIDEO CODING

(71) Applicant: QUALCOMM Incorporated, San Diego, CA (US)

(72) Inventors: Yu Han, San Diego, CA (US); Geert Van der Auwera, Del Mar, CA (US); Muhammed Zeyd Coban, Carlsbad, CA (US); Wei-Jung Chien, San Diego, CA (US); Yung-Hsuan Chao, San Diego, CA (US); Alican Nalci, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/918,741

(22) Filed: Jul. 1, 2020

(65) Prior Publication Data
US 2021/0006792 A1  Jan. 7, 2021

Related U.S. Application Data

(60) Provisional application No. 62/871,028, filed on Jul. 5, 2019.

(51) Int. Cl.
*H04N 19/124* (2014.01)
*H04N 19/176* (2014.01)
*H04N 19/96* (2014.01)
*H04N 19/463* (2014.01)
*H04N 19/186* (2014.01)

(52) U.S. Cl.
CPC ......... *H04N 19/124* (2014.11); *H04N 19/176* (2014.11); *H04N 19/186* (2014.11); *H04N 19/463* (2014.11); *H04N 19/96* (2014.11)

(58) Field of Classification Search
CPC .............................. H04N 19/96; H04N 19/70
See application file for complete search history.

(56) References Cited

U.S. PATENT DOCUMENTS 9,451,258 B2   9/2016   Van Der Auwera et al.
10,097,832 B2   10/2018   Sullivan
(Continued)

FOREIGN PATENT DOCUMENTS

CA    3026657 A1    1/2018
WO    2017206826 A1   12/2017

OTHER PUBLICATIONS

Bossen F., "VTM-5.0, Tags, JVET/VVCSoftware_VTM, GitLab", JVET, Jun. 2019, https://vcgit.hhi.fraunhofer.de/jvet/VVCSoftware_VTM/-/tags/VTM-5.0, pp. 1-3.
(Continued)

*Primary Examiner* — Jerry T Jean Baptiste
(74) *Attorney, Agent, or Firm* — Shumaker & Sieffert, P.A.

(57) ABSTRACT

Examples of block-level signaling of quantization parameter offsets is described. Such block-level signaling of quantization parameter offsets provides block level flexibility to determine a more precise chroma quantization parameter (QP) for a chroma block. With the block-level quantization parameter offset signaling described in this disclosure, there is more flexibility in defining the chroma QP, resulting in more accurate determination of chroma QP on a chroma block-by-chroma block basis.

31 Claims, 7 Drawing Sheets

(56) References Cited

U.S. PATENT DOCUMENTS

| | | | |
|---|---|---|---|
| 10,334,257 | B2 | 6/2019 | Oh et al. |
| 10,368,094 | B2 | 7/2019 | Budagavi |
| 10,555,006 | B2 | 2/2020 | Zhang et al. |
| 2013/0034149 | A1* | 2/2013 | Karuchula .......... H04N 19/124 375/240.03 |
| 2014/0003497 | A1 | 1/2014 | Sullivan et al. |
| 2015/0071344 | A1* | 3/2015 | Tourapis .............. H04N 19/124 375/240.03 |
| 2015/0172662 | A1 | 6/2015 | Pearson |
| 2017/0302929 | A1 | 10/2017 | Chen et al. |
| 2018/0020241 | A1 | 1/2018 | Li et al. |
| 2019/0289306 | A1 | 9/2019 | Zhao et al. |
| 2020/0322602 | A1 | 10/2020 | Huang et al. |
| 2020/0382799 | A1* | 12/2020 | Chernyak .............. H04N 19/66 |
| 2021/0176495 | A1* | 6/2021 | Iwamura ................ H04N 19/61 |

OTHER PUBLICATIONS

Bross B., et al., "Versatile Video Coding (Draft 5)", 14th JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v9, Jun. 25, 2019 (Jun. 25, 2019), XP030220730,403 Pages, Retrieved from the Internet: URL:http://phenix.int-evry.fr/jvet/doc_end_user/documents/14_Geneva/wg11/JVET-N1001-v9.zip, JVET-N1001-v9.docx [retrieved on Jun. 25, 2019].

Bross B., et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

Bross B., et al., "Versatile Video Coding (Draft 9)", JVET-R2001-vB, Joint Video Experts Team (JVET) of ITU-T SG 16 WP 3 and ISO/IEC JTC 1/SC 29/WG 11, 18th Meeting: by teleconference, Apr. 15-24, 2020, 532 Pages.

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 ), URL: http://phenix.int-evry.fr/jvet/, No. JVET-A1001, Feb. 24, 2016 (Feb. 24, 2016), XP030150000, 27 Pages.

Chernyak (Huawei) R., et al., "Non-CE7: Delta QP for Chroma CU", 13. JVET Meeting, Jan. 9, 2019-Jan. 18, 2019, Marrakech, (The Joint Video Exploration Team of ISO/IEC JTC1/SC29/WG11 and ITU-T SG.16 ), No. JVET-M0105, Jan. 13, 2019 (Jan. 13, 2019), XP030201901, 3 pages, Retrieved from the Internet: URL: http://phenix.int-evry.fr/jvet/doc_end_user/documents/13_Marrakech/wg11/JVET-M0105-v3.zip JVET-M0105-v3.docx [retrieved on Jan. 13, 2019].

Han (Qualcomm) Y., et al., "Cu level Chroma QP Control for VVC", JVET-O1168, 127th MPEG Meeting, Jul. 8, 2019-Jul. 12, 2019, Gothenburg; (Motion Picture Expert Group of ISO/IEC JTC1/SC29/WG11), No. M49869, Jul. 10, 2019 (Jul. 10, 2019), XP030208478, pp. 1-9, Retrieved from the Internet: URL: http://phenix.int-evry.fr/mpeg/doc_end_user/documents/127_Gothenburg/wg11/m49869-JVET-O1168-v1-JVET-O1168.zip JVET-O1168.docx [retrieved on Dec. 9, 2020].

International Search Report and Written Opinion—PCT/US2020/040661—ISA/EPO—dated Aug. 31, 2020) (17 pp).

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lainema A., "CE7: Joint Coding of Chrominance Residuals (CE7-1)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0054, pp. 1-5, XP030254461, URL: http://phenix.int evry.fr/jvet/doc_end_user/documents/14_Geneva/wg11/JVET-N0054-v1. zip JVET-N0054.docx.

Mccann K., et al., "High Efficiency Video Coding (HEVC) Test Model 16 (HM 16) Encoder Description", 110. MPEG Meeting, Oct. 20, 2014-Oct. 24, 2014, Strasbourg, (Motion Picture Expert Group or ISO/IEC JTC1/SC29/WG11), No. N14970, Feb. 12, 2015 (Feb. 12, 2015), 54 Pages, XP030270867, Retrieved from the Internet: URL: http://phenix.int-evry.fr/mpeg/doc_end_user/documents/110_Strasbourg/wg11/w14970-v2-w14970.zip w14970.doc, [retrieved on Feb. 12, 2015].

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Wenger S., et al., "AHG17: Signalling Zero or more Sub-Profiles", JVET-O0044, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-2.

U.S. Appl. No. 16/912,232, filed Jun. 25, 2020, 63 Pages.

Flynn, D. et al., "RExt: CU-Adaptive Chroma QP Offsets", JCTVC-O0044, Joint Collaborative Team on Video Coding (JCT-VC) of ITU-T SG16 WP3 and ISO/IEC JTC1/SC29/WG11, 15th Meeting, Geneva, CH, Oct. 23-Nov. 1, 2013, pp. 1-4.

* cited by examiner

CHROMA DELTA QUANTIZATION PARAMETER (QP) IN VIDEO CODING

This application claims the benefit of U.S. Provisional Application No. 62/871,028, filed Jul. 5, 2019, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining chroma quantization parameter (QP). The techniques may be applied to any of the existing video codecs, such as HEVC (High Efficiency Video Coding), VVC (Versatile Video Coding), or be an efficient coding tool in any future video coding standards.

In video coding, a chroma QP indicates an amount of quantization that a video encoder applies to coefficient values of a residual block and an amount of inverse-quantization that a video decoder applies to quantized coefficient values to generate the residual block. In some examples, rather than a video encoder signaling the chroma QP, a video decoder may utilize a QP predictor, which may be based on a luma QP of a corresponding luma block to the chroma block, and one or more quantization parameter offsets to determine the chroma QP.

This disclosure describes example techniques of block-level signaling of quantization parameter offsets. Such block-level signaling of quantization parameter offsets provides block level flexibility to determine a more precise chroma QP for a chroma block. For instance, some techniques relied on quantization parameter offsets that are signaled at a picture level or slice level, so that the quantization parameter offsets were the same for each chroma block in the picture or slice. Such high level signaling (e.g., at picture and/or slice level) limits granularity in defining the chroma QP for a chroma block. With the block-level quantization parameter offset signaling described in this disclosure, there is more flexibility in defining the chroma QP, resulting in more accurate determination of chroma QP on a chroma block-by-chroma block basis.

In this way, the example techniques provide technical solutions to a technical problem by providing signaling that increases flexibility to more accurately define the chroma QP. The example techniques described in more detail provide a practical application to video coding, such as a way in which to determine the chroma QP that is more accurate, resulting in better video coding, as compared to other techniques that rely on high level signaling such as picture level or slice level signaling to define the offsets for determining the chroma QP.

In one example, the disclosure describes a method of decoding video data, the method comprising determining a quantization parameter predictor for a chroma block of the video data based on a quantization parameter for a corresponding luma block, determining a block level quantization parameter offset for the chroma block, determining a quantization parameter for the chroma block based on the block level quantization parameter offset and the quantization parameter predictor, determining a residual block based on the quantization parameter, and reconstructing the chroma block based on the residual block.

In one example, the disclosure describes a device for decoding video data, the device comprising memory configured to store a quantization parameter for a corresponding luma block of a chroma block of the video data and processing circuitry coupled to the memory and configured to determine a quantization parameter predictor for the chroma block of the video data based on the quantization parameter for the corresponding luma block, determine a block level quantization parameter offset for the chroma block, determine a quantization parameter for the chroma block based on the block level quantization parameter offset and the quantization parameter predictor, determine a residual block based on the quantization parameter, and reconstruct the chroma block based on the residual block.

In one example, the disclosure describes a computer-readable storage medium storing instructions thereon that when executed cause one or more processors of a device for decoding video data to determine a quantization parameter predictor for a chroma block of the video data based on a quantization parameter for a corresponding luma block, determine a block level quantization parameter offset for the chroma block, determine a quantization parameter for the chroma block based on the block level quantization parameter offset and the quantization parameter predictor, determine a residual block based on the quantization parameter, and reconstruct the chroma block based on the residual block.

In one example, the disclosure describes a device for decoding video data, the device comprising means for determining a quantization parameter predictor for a chroma block of the video data based on a quantization parameter for a corresponding luma block, means for determining a block level quantization parameter offset for the chroma block, means for determining a quantization parameter for the chroma block based on the block level quantization parameter offset and the quantization parameter predictor, means for determining a residual block based on the quantization parameter, and means for reconstructing the chroma block based on the residual block.

In one example, the disclosure describes a method of encoding video data, the method comprising determining a quantization parameter predictor for a chroma block of the video data based on a quantization parameter for a corresponding luma block, determining a block level quantization parameter offset for the chroma block, determining a quantization parameter for the chroma block based on the block level quantization parameter offset and the quantization parameter predictor, quantizing coefficient values for a residual block based on the determined quantization parameter for the chroma block, and signaling information indicative of the quantized coefficient values.

In one example, the disclosure describes a device for encoding video data, the device comprising memory configured to store a quantization parameter for a corresponding luma block of a chroma block of the video data and processing circuitry coupled to the memory and configured to determine a quantization parameter predictor for a chroma block of the video data based on a quantization parameter for a corresponding luma block, determine a block level quantization parameter offset for the chroma block, determine a quantization parameter for the chroma block based on the block level quantization parameter offset and the quantization parameter predictor, quantize coefficient values for a residual block based on the determined quantization parameter for the chroma block, and signal information indicative of the quantized coefficient values.

The details of one or more examples are set forth in the accompanying drawings and the description below. Other features, objects, and advantages will be apparent from the description, drawings, and claims.

DETAILED DESCRIPTION

Figure 1:
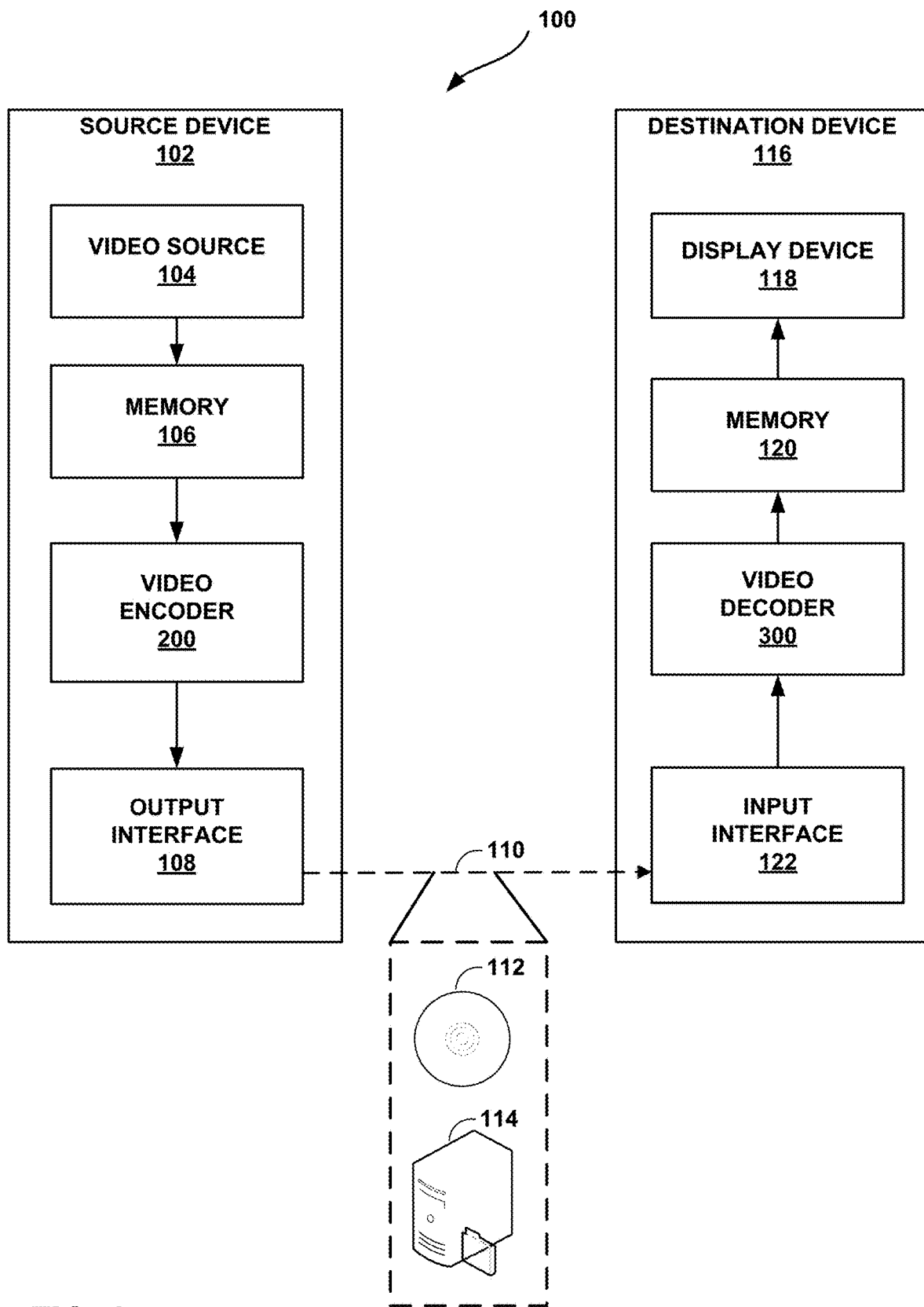
FIG. 1 is a block diagram illustrating an example video encoding and decoding system that may perform the techniques of this disclosure.

In video coding, a video encoder determines a prediction block for a current block being encoded and determines a residual block indicative of difference between the prediction block and the current block. The video encoder may perform a transform that transforms the residual values to transform coefficients. The transform may be skipped in some cases. After transform (or where transform is skipped), the video encoder performs a quantization of the coefficients. The video encoder signals the quantized coefficients to the video decoder which performs the reciprocal operations as the video encoder to generate the residual block. Video decoder utilizes the same techniques as the video encoder to determine the prediction block and adds the residual block to the prediction block to reconstruct the current block.

The video coding process is performed on luma and chroma components. In other words, the current block includes a luma block and one or more chroma blocks. The chroma block(s) may be subsampled relative to the luma block based on the particular color format.

A quantization parameter determines how much quantization the video encoder applies and amount of inverse quantization the video decoder applies. In some examples, rather than signaling the quantization parameter for a chroma block, the quantization parameter for a luma block corresponding to the chroma block may be used to determine a quantization parameter predictor for the quantization parameter for the chroma block. For example, the quantization parameter for the luma block is the quantization parameter predictor, but other ways to determine the quantization parameter predictor based on the quantization parameter for the luma block are possible (e.g., such as average of quantization parameters of neighboring luma blocks). In such examples, for a chroma block, the video encoder may signal offsets that the video decoder adds to the quantization parameter predictor.

In some techniques, the offsets that the video encoder signals are offsets that are constant for the entire picture or entire slice of the current block. For example, the offset may be pps_cb_qp_offset for the Cb chroma block or pps_cr_qp_offset for the Cr chroma block. These example offsets are at a picture level (e.g., applicable to blocks in the picture). Another example is the slice_cb_qp_offset for the Cb chroma block or slice_cr_qp_offset for the Cr chroma block. These example offsets are at a slice level (e.g., applicable to blocks in the slice). Accordingly, if the $Qp_Y$ (e.g., QP for luma) is the quantization parameter predictor, then in some techniques, the $Qp_{CR}$ (quantization parameter for Cr chroma block) is $Qp_Y$+pps_cb_qp_offset+slice_cb_qp_offset, clipped to within a specified range. The $Qp_{CB}$ (quantization parameter for Cb chroma block) is $Qp_Y$+pps_cr_qp_offset+slice_cr_qp_offset, clipped to within a specified range. It should be understood that $Qp_Y$ being the quantization parameter predictor is merely one example and should not be considered limiting. In some examples, the quantization parameter predictor may be determined from $Qp_Y$, and may not explicitly be $Qp_Y$.

There may be problems with such techniques. The picture level and slice level offsets (e.g., pps_cb or cr_qp_offset and slice_cb or cr_qp_offset, respectively) may not provide sufficient flexibility to allow the video decoder to accurately determine the quantization parameter for a chroma block. For example, if the actual chroma block quantization parameter for the Cb chroma block is different than $Qp_Y$+pps_cb_qp_offset+slice_cb_qp_offset, there may not be a way for the video encoder to further refine the quantization parameter for the Cb chroma block because the quantization parameter for the Cb chroma block may be limited to three factors: $Qp_Y$, pps_cb_qp_offset, and slice_cb_qp_offset.

This disclosure describes block level signaling of offset that the video encoder or video decoder can add to a quantization parameter predictor to determine a quantization parameter for a chroma block. As one example, the video encoder and the video decoder each construct a list of quantization parameter offsets. The video encoder signals an index into the list of quantization parameter offsets, and the video decoder determines the block level quantization parameter offset based on the index into the list of quantization parameter offsets and adds the offset to the quantization parameter predictor.

For example, assume that CuQpOffsetCb is the block level quantization parameter offset that the video decoder determines based on an index into the list of quantization parameter offsets for the Cb chroma block, and CuQpOffsetCr is the block level quantization parameter offset that the video decoder determines based on the index into the list of quantization parameter offsets for the Cr chroma block. For such examples, the quantization parameter for the Cb chroma block may be $Qp_Y$+pps_cb_qp_offset+slice_cb_qp_offset+CuQpOffsetCb, and the quantization parameter for the Cr chroma block may be $Qp_Y$+pps_cr_qp_offset+slice_cr_qp_offset+CuQpOffsetCr. The same may apply for joint Cb Cr blocks.

In this way, CuQpOffsetCb and CuQpOffsetCb provide block level flexibility for determining the quantization parameter for Cb and Cr chroma blocks. For instance, without CuQpOffsetCb and CuQpOffsetCb, the quantization parameter for Cb and Cr chroma blocks would be limited by the quantization parameter predictor and quantization parameter offsets signaled at picture level or slice level, and there would not be a way in which to define the quantization parameter based on block level quantization parameter offsets. With the example techniques described in this disclosure, the video encoder can signal information to define block level quantization parameter offsets, rather than being limited to picture level or slice level signaling of quantization parameter offsets.

For example, the block level quantization parameter offset for two chroma blocks (e.g., two Cb chroma blocks or two Cr chroma blocks) in the same picture or slice may be different, and the block level quantization parameter offsets may be determined on a chroma block-by-chroma block basis. The pps_cb_qp_offset and pps_cr_qp_offset are picture level offset, so that two Cb chroma blocks or two Cr chroma blocks in the same picture have the same pps_cb_qp_offset or the same pps_cr_qp_offset, respectively. The slice_cb_qp_offset and slice_cr_qp_offset are slice level offsets, so that two Cb chroma blocks or two Cr chroma blocks in the same slice have the same slice_cb_qp_offset or slice_cr_qp_offset, respectively.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling and parsing chroma delta quantization parameter (QP). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling and parsing chroma delta QP. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Description of HEVC is available at G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12). Retrieved 2012-09-14.

Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v9 (hereinafter "VVC Draft 5"). A more recent draft of the VVC standard is described in Bross, et al. "Versatile Video Coding (Draft 9)," Joint Video Experts Team (WET) of ITU-T SG 16 WP 3 and ISO/IEC JTC 1/SC 29/WG 11, 18$^{th}$ Meeting: by teleconference, 15-24 Apr. 2020, WET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT) may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

This disclosure describes example ways in which video encoder 200 may determine the quantization parameter (QP) for a chroma block for quantizing. The QP may be a value that defines an amount of quantization that is to be applied the transform coefficients. In some examples, video encoder 200 may determine the actual QP for a chroma block (e.g., Cb or Cr chroma block) based on rate-distortion measurements and signal information indicative of the actual QP.

However, to reduce the number of bits that need to be signaled (e.g., increase bandwidth), video encoder 200 may utilize a QP predictor for the chroma block. In some examples, the QP predictor may be the QP for the luma block corresponding to the chroma block or based on QPs of a plurality of luma blocks. For instance, as described above, a coding unit may include a luminance component and/or a chrominance component. A luma block includes the samples of the luminance component, and a chroma block includes the samples of the chrominance component. Accordingly, for a coding unit there may be one luma block and two chroma blocks (e.g., Cb chroma block and Cr chroma block). A luma block and the two chroma blocks that together form the coding unit may be referred to as corresponding to one another because of the location of the chroma block and the location of the luma block overlap.

Based on the color format, the size of the chroma blocks may be different than the size of the luma blocks (e.g., the chroma blocks are downsampled relative to the luma blocks). For instance, in 4:2:0 color format, the luma block is N×N and in size the chroma block is N/2×N/2 in size. In this example, one chroma block of size N×N would correspond with four N×N sized luma blocks.

In some examples, the QP for the luma block (e.g., luma QP) may be a QP predictor for the QPs for both of the corresponding chroma blocks. In some examples, a plurality of luma blocks may be correspond to one chroma block, and some average of the luma QPs of the plurality of luma blocks may be a QP predictor for the QPs for both of the corresponding chroma blocks. In any event, video encoder 200 may determine a quantization parameter predictor for a chroma block of video data based on a quantization parameter for a corresponding luma block.

Video encoder 200 may also determine an offset value, such that when the offset value is added to the QP predictor, the result is the quantization parameter for the chroma block. In accordance with one or more examples described in this disclosure, video encoder 200 may determine block level quantization parameter offset for a chroma block that when added to the QP predictor (possibly with some additional offsets), the result is the quantization parameter for a chroma block.

Block level quantization parameter offset may refer to quantization parameter offset that can be different on block-by-block basis. For instance, in some techniques, video encoder 200 may be limited to signaling high-level offsets, such as picture level offsets or slice level offsets, that are the same for all chroma blocks in a picture or slice. In some of those techniques, there may be no way in which to define, at a block level, what the offset should be. That is, there may not be block level granularity to define the offset for a chroma block. Rather, the offset would be the same for all blocks in the picture or slice.

In some of those techniques, where the offset is the same for all blocks in the picture or slice, utilizing the same offset to determine the quantization parameters for each of the chroma blocks may result in some of the chroma blocks having suboptimal quantization parameters. For instance, if the slice level or picture level offset is equal to A and B, respectively, Y1 is the quantization parameter predictor for a first chroma block in the slice, and Y2 is the quantization parameter predictor for a second chroma block in the slice, then the quantization parameter for the first chroma block would be Y1+A+B and the quantization parameter for the second chroma block would be Y2+A+B. In some of those techniques, there may not be a way in which to define a block level quantization parameter offset for the first chroma block that is different than the block level quantization parameter offset for the second chroma block. Rather, the quantization parameter offset is limited to A and B for both the first and the second chroma blocks.

In accordance with techniques described in this disclosure, video encoder 200 may determine a block level quantization parameter offset for a chroma block, and determine a quantization parameter for the chroma block based on the block level quantization parameter offset and the quantization parameter predictor. For instance, there may be N number of possible block level quantization parameter offsets to select from, and video encoder 200 may select a block level quantization parameter offset that when added to the quantization parameter predictor (possibly with other offsets as well) results in the best quantization parameter for the chroma block. Video encoder 200 may then quantize coefficient values for a residual block based on the determined quantization parameter for the chroma block, and signal information indicative of the quantized coefficient values.

As described above, there may be two chroma blocks (e.g., Cb and Cr chroma blocks). In one or more examples, video encoder 200 may perform similar operations for both Cb chroma block and Cr chroma block. In some examples, there may be a joint chroma block that is a combination of the Cb and Cr chroma blocks (e.g., JointCbCr chroma block), and the example techniques described in this disclosure are applicable to the JointCbCr chroma block as well. Accordingly, in the above examples that refer to a chroma block, the chroma block may be a Cb chroma block, a Cr chroma block, or a JointCbCr chroma block.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. For example, video decoder 300 may be configured to determine a quantization parameter for a chroma block using the example techniques described in this disclosure.

As described above, video encoder 200 may be configured to determine a quantization parameter predictor for a chroma block. Video decoder 300 may perform similar operations to determine a quantization parameter predictor for a chroma block of video data based on a quantization parameter for a corresponding luma block. The quantization parameter predictor may be the quantization parameter of the corresponding luma block or may be some average of the quantization parameters of a plurality of luma blocks that may correspond to the chroma block. In general, the quantization parameter predictor may be determined based on the quantization parameter of the corresponding luma block, and need not necessarily be the quantization parameter of the corresponding luma block.

Video decoder 300 may also determine a block level quantization parameter offset for the chroma block. For instance, video encoder 200 may signal information to video decoder 300 that video decoder 300 uses to determine the block level quantization parameter offset. As one example, as described above, there may be N number of possible block level quantization parameter offsets for video encoder 200 to select from, and video encoder 200 may signal information indicating which one of the N number of possible block level quantization parameter offsets video decoder 300 is to select.

To determine the quantization parameter for the chroma block, video decoder 300 may determine a quantization parameter for the chroma block based on the block level quantization parameter offset and the quantization parameter predictor. For instance, video decoder 300 may add the block level quantization parameter offset to the quantization parameter predictor (and possibly add some additional other offsets) to determine the quantization parameter for the chroma block.

Video decoder 300 may determine a residual block based on the quantization parameter. For instance, video decoder 300 may perform the inverse quantization based on the quantization parameter to determine the residual block.

Video decoder 300 may use a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. For example, video decoder 300 may reconstruct the chroma block based on the residual block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, in one or more examples, video encoder 200 and video decoder 300 may be configured to determine quantization parameters for chroma blocks using block level quantization parameter offsets. For instance, video encoder 200 and video decoder 300 may utilize similar techniques to determine a quantization parameter predictor for a chroma block of the video data based on a quantization parameter for a corresponding luma block. The quantization parameter predictor may be the quantization parameter of the corresponding luma block or may be an average of quantization parameters of a plurality of corresponding luma blocks, or some other technique that utilizes the quantization parameter of the corresponding luma block may be used to determine the quantization parameter predictor.

Video encoder 200 and video decoder 300 may determine a block level quantization parameter offset for the chroma block. The block level quantization parameter offset for the chroma block may mean that the block level quantization parameter offset can be different for different chroma blocks in same slice or picture. For instance, a slice may include two or more chroma blocks. In one or more examples, a first block level quantization parameter offset for a first chroma block in the slice and a second block level quantization parameter offset for a second chroma block in the same slice may be different.

In one or more examples, video encoder 200 and video decoder 300 may determine a quantization parameter for the chroma block based on the block level quantization parameter offset and the quantization parameter predictor. In addition to the block level quantization parameter offset, there may be a first quantization parameter offset in a picture parameter set and a second quantization parameter offset in a slice parameter set (e.g., slice header). For instance, video encoder 200 may signal and video decoder 300 may receive the first quantization parameter offset from a picture parameter set (PPS), and video encoder 200 may signal and video decoder 300 may receive the second quantization parameter from a slice parameter set (e.g., information signaled at the slice level). Video encoder 200 and video decoder 300 may add the first quantization parameter offset, the second quantization parameter offset, the block level quantization parameter offset, and the quantization parameter predictor to determine the quantization parameter for the chroma block.

Based on the quantization parameter, video encoder 200 and video decoder 300 may perform quantizing or inverse-quantizing. For example, video encoder 200 may quantize coefficient values for a residual block based on the determined quantization parameter for the chroma block. Video decoder 300 may inverse-quantize received values to generate the residual block based on the determined quantization parameter for the chroma block. Video encoder 200 may signal information indicative of the quantized coefficient values. Video decoder 300 may add the residual block to a prediction block to reconstruct the chroma block.

As described, video encoder 200 and video decoder 300 may be configured to determine the block level quantization parameter offset for the chroma block. In some examples, there may be N block level quantization parameter offsets from which to select the block level quantization parameter offset for the chroma block. For instance, video encoder 200 may construct a list of quantization parameter offsets, which include the N block level quantization parameter offsets from which to select the block level quantization parameter offset for a chroma block. Video encoder 200 may signal information indicating the values in the list of quantization parameter offsets to video decoder 300, and video decoder 300 may construct the list of quantization parameter offsets based on the signaled information.

However, in some examples, the list of quantization parameter offsets may be predefined and pre-stored. In some examples, video encoder 200 and video decoder 300 may each follow similar operations to construct the list of quantization parameter offsets using implicit techniques that do not require video encoder 200 to signal to video decoder 300 the information for constructing the list of quantization parameter offsets. There may be various ways in which to construct the list of quantization parameter offsets (e.g., signaling, pre-stored, or implicit), and the example techniques are not limited to any particular way in which video encoder 200 and video decoder 300 construct the list of quantization parameter offsets.

In one or more examples, video encoder 200 may determine which quantization parameter offset to select from the list of quantization parameter offsets and signal an index into the list of quantization parameter offsets. Video decoder 300 may receive an index into the list of quantization parameter offsets and determine the block level quantization parameter offset based on the index into the list of quantization parameter offsets.

Video encoder 200 and video decoder 300 may perform similar operations to determine block level quantization parameter offsets for each of the chroma blocks for the different chroma components. For instance, video encoder 200 and video decoder 300 may construct a first list of quantization parameter offsets for the Cb chroma block and a second list of quantization parameter offsets for the Cr chroma block.

For instance, there may be a luma block and two chroma blocks (e.g., one chroma block for each chroma component). There may be a Cb chroma block (e.g., a first chroma block of a first chroma component) and a Cr chroma block (e.g., a second chroma block of a second chroma component). In this example, the Cb chroma block and the Cr chroma block may share the same quantization parameter predictor (e.g., because the Cb chroma block and Cr chroma block correspond to the same luma block or plurality of luma blocks). However, the block level quantization parameter offset for the Cb chroma block and the Cr chroma block may be different. It is possible for the quantization parameter predictor for the Cb chroma block and the Cr chroma block to be different.

Although the block level quantization parameter offset for the Cb chroma block and Cr chroma block may be different, video encoder 200 and video decoder 300 may utilize the same index into respective lists of quantization parameter offsets. For example, video encoder 200 may signal and video decoder 300 may receive an index into the first list of quantization parameter offsets for the first chroma block of the first color component (e.g., Cb chroma block) to determine the quantization parameter for the first chroma block of the first color component. Video encoder 200 and video decoder 300 may utilize the same index into the second list of quantization parameter offsets for the second chroma block of the second color component (e.g., Cr chroma block) to determine the quantization parameter for the second chroma block of the second color component. Accordingly, there may be two lists of quantization parameter offsets, but only one index may be needed.

Figure 2A:
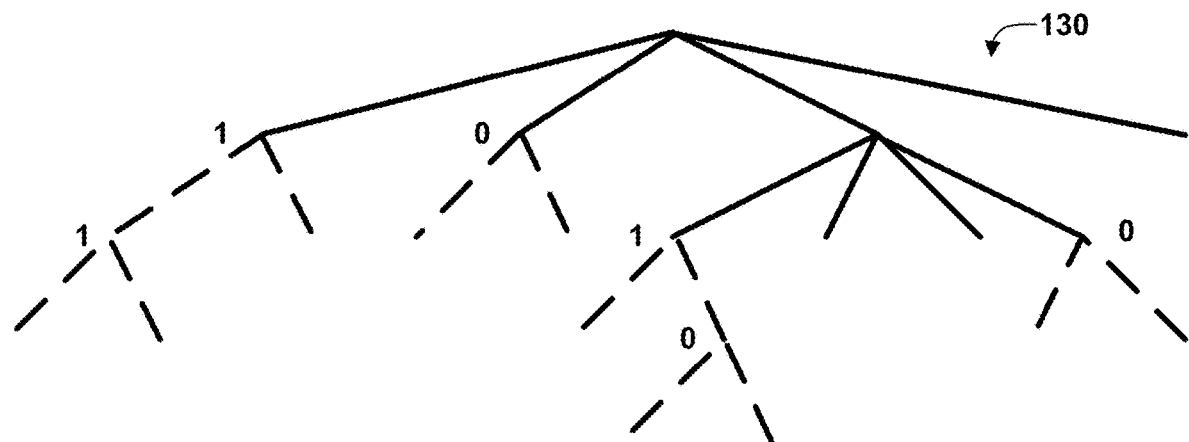
FIGS. 2A and 2B are conceptual diagrams illustrating an example quadtree binary tree (QTBT) structure, and a corresponding coding tree unit (CTU).
Figure 2B:
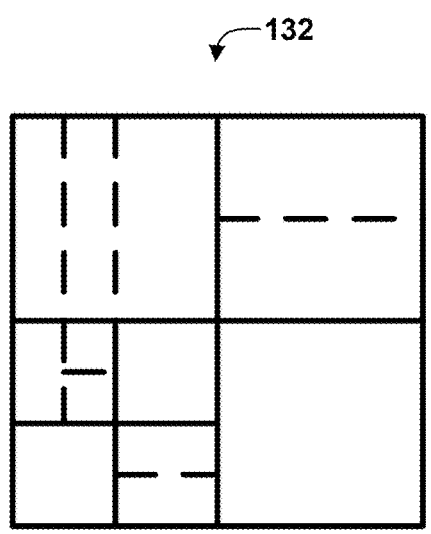

FIGS. 2A and 2B are conceptual diagram illustrating an example quadtree binary tree (QTBT) structure 130, and a corresponding coding tree unit (CTU) 132. The solid lines represent quadtree splitting, and the dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dotted lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dotted lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

The following describes some video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

There may be certain issues in current techniques for determining chroma quantization parameter (QP). As described above, the QP indicates the amount by which to quantize or inverse-quantize coefficients in a block.

In VVC Draft 5, a chroma QP is derived as below:

$qPi_{Cb}$=Clip3(-QpBdOffset$_C$,69,$Qp_Y$+pps_cb_qp_offset+slice_cb_qp_offset)

$qPi_{Cr}$=Clip3(-QpBdOffset$_C$,69,$Qp_Y$+pps_cr_qp_offset+slice_cr_qp_offset)

In the above equation, $qPi_{Cb}$ is the quantization parameter for the Cb chroma block, and $qPi_{Cr}$ is the quantization parameter for the Cr chroma block. $Qp_Y$ is a quantization parameter predictor, and in some examples is the quantization parameter for a corresponding luma block to the Cb chroma block and the Cr chroma block. $Qp_Y$ being the quantization parameter predictor is merely one example. The quantization parameter predictor may be based on $Qp_Y$ without necessarily being equal to $Qp_Y$ (e.g., the quantization parameter predictor may be determined as a function of $Qp_Y$).

The syntax element pps_cb_qp_offset is an offset value signaled in the picture parameter set for the Cb chroma block, and the syntax element pps_cr_qp_offset is an offset value signaled in the picture parameter set for the Cr chroma block. The syntax element slice_cb_qp_offset is an offset value signaled in the slice parameter set (e.g., such as slice header) for the Cb chroma block, and the syntax element slice_cr_qp_offset is an offset value signaled in the slice parameter set for the Cr chroma block. The value of QpBdOffset$_C$ may be a preselected or determined value.

Accordingly, in VVC Draft 5, the value of $qPi_{Cb}$ is equal to $Qp_Y$+pps_cb_qp_offset+slice_cb_qp_offset, but clipped to within -QpBdOffset$_C$ and 69 if $Qp_Y$+pps_cb_qp_offset+slice_cb_qp_offset is outside that range. Similarly, in VVC Draft 5, the value of $qPi_{Cr}$ is equal to $Qp_Y$+pps_cr_qp_offset+slice_cr_qp_offset, but clipped to within -QpBdOffset$_C$ and 69 if $Qp_Y$+pps_cr_qp_offset+slice_cr_qp_offset is outside that range.

As described above and also described in more detail below, pps_cb_qp_offset and slice_cb_qp_offset apply to all Cb chroma blocks in a picture or slice. Therefore, there may not be block level quantization parameter offsets that can be used to determine the $qPi_{Cr}$ value for a Cb chroma block. Similarly, pps_cr_qp_offset and slice_cr_qp_offset apply to all Cr chroma blocks in a picture or slice. Therefore, there may not be block level quantization parameter offsets that can be used to determine the $qPi_{Cr}$ value for a Cr chroma block. This disclosure describes example techniques for utilizing block level quantization parameter offset for determining the quantization parameter for the Cb chroma block (e.g., $qPi_{Cb}$) and the quantization parameter for the Cr chroma block (e.g., $qPi_{Cr}$)

Figure 5:
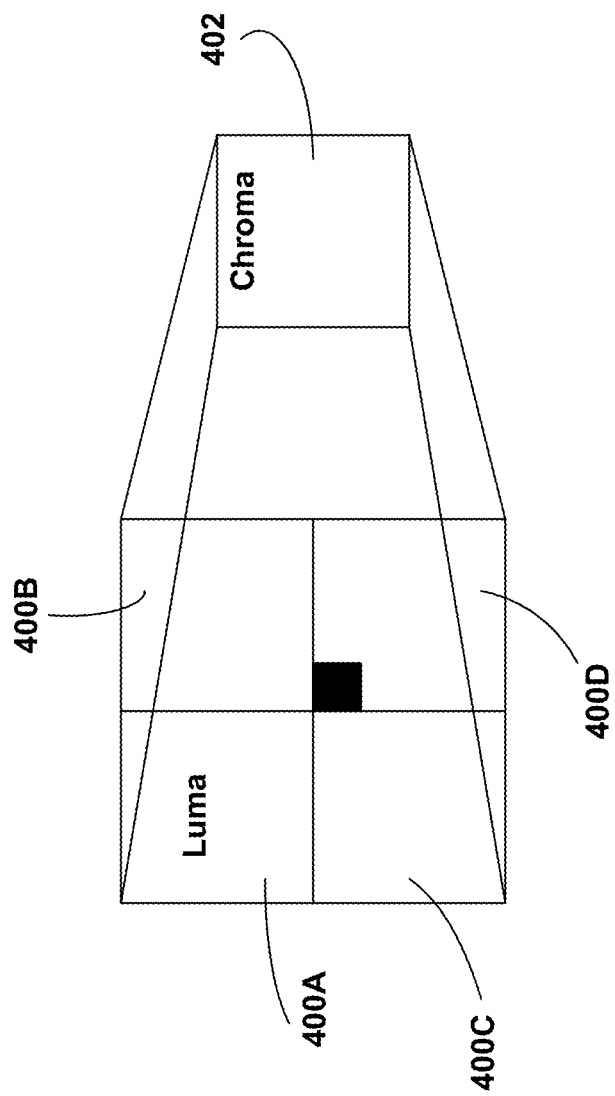
FIG. 5 is a conceptual diagram illustrating an example of a chroma coding unit (CU) and its corresponding luma CUs in separate tree.

For instance, when the tree type is a separate tree type (e.g., chroma and luma blocks are partitioned independently), the variable $Qp_Y$ is set equal to the luma QP of the luma CB (coding block) that covers the luma position (xCb+cbWidth/2, yCb+cbHeight/2). As shown in FIG. 5, one chroma coding block (CB) 402 may cover more than one luma CBs. For example, chroma CB 402 covers luma CBs 400A-400D. These luma CBs 400A-400D can be from different quantization groups (QGs) with different QPs. The predicted QP derived from the center position may be not an accurate prediction for the chroma CB, and picture parameter set (PPS)/slice level QP offset adjustment is limited (e.g., pps_cr_qp_offset and slice_cr_qp_offset and pps_cb_qp_offset and slice_cb_qp_offset may be limited). There may be no scheme of flexible adjusting chroma QP in the current VVC.

One example way in which to address some deficiencies with flexible adjustment of chroma QP is to fix the luma delta QP signaling in VVC. For instance, in VVC Draft 5, the condition of signaling luma delta QP may not be correct. Partial syntax is as below.

```
if( ( tu_cbf_luma[ x0 ][ y0 ] | | tu_cbf_cb[ x0 ][ y0 ] | |
tu_cbf_cr[ x0 ][ y0 ]) &&
        treeType != DUAL_TREE_CHROMA) {
        if( cu_qp_delta_enabled_flag
        && !IsCuQpDeltaCoded ) {
            cu_qp_delta_abs                                    ae(v)
            if( cu_qp_delta_abs)
                cu_qp_delta_sign_flag                          ae(v)
        }
    }
```

According to the syntax, when treeType equals to DUAL_TREE_LUMA, and tu_cbf_luma equals to 0, and tu_cbf_cb or tu_cbf_cr equals to 1, luma delta QP still can be signaled. Signaling of luma delta QP in this case may be erroneous (e.g., unnecessary or cause video decoder 300 to perform in an unexpected manner). When the tree type is dual tree luma, the luma delta QP signaling may not (e.g., should not) depend on the CBF flag (coded bit flag indicating whether any bit in the block is significant) of chroma (tu_cbf_cb, tu_cbf_cr). For example, CBF flags of tu_cbf_luma[x0][y0], tu_cbf_cb[x0][y0], tu_cbf_cr[x0][y0] equals to 1 means there is coding bin in the coding block. Otherwise, CBF equals to 0 means there is no coding bin in the coding block. In one example, the disclosure describes modifications to the condition of luma delta QP signaling. When the tree type is dual tree luma, the luma delta QP signaling may depend on luma CBF flag, and may not (e.g., does not) depend on chroma CBF flag. The partial syntax is as below: where new syntax is shown with text between <ADD> and </ADD> and removed syntax is shown with text between <DELETE> and </DELETE>

```
<ADD> If(treeType != DUAL_TREE_CHROMA)
{ </ADD>
    if((( tu_cbf_luma[ x0 ][ y0 ] | | tu_cbf_cb[ x0 ][ y0 ] | |
tu_cbf_cr[ x0 ][ y0 ] ) <DELETE> &&
      treeType != DUAL_TREE_CHROMA </DELETE> <ADD> &&
treeType != DUAL_TREE_LUMA )
    || (tu_cbf_luma[ x0 ] [ y0 ] && treeType ==
    DUAL_TREE_LUMA </ADD>) ) {
        if( cu_qp_delta_enabled_flag
        && !IsCuQpDeltaCoded ) {
            cu_qp_delta_abs                    ae(v)
            if( cu_qp_delta_abs )
                cu_qp_delta_sign_flag          ae(v)
        }
    }
<ADD> } </ADD>
```

In one example, video encoder 200 and video decoder 300 may be configured to apply the CU level chroma QP offset method of HEVC range extension directly to VVC (e.g., extended CU chroma QP offset from Cb, Cr components to joint_cbcr (joint coding of chrominance residuals, JCCR)). The partial syntax is as below. Underline shows addition.

```
<ADD> If(( tu_cbf_cb[ x0 ] [ y0 ] | |
tu_cbf_cr[ x0 ] [ y0 ] ) &&
    cu_chroma_qp_offset_enabled_flag
    && !IsCuChromaQpOffsetCoded ) {
        cu_chroma_qp_offset_flag              ae(v)
        if( cu_chroma_qp_offset_flag &&
        chroma_qp_offset_list_len_minus1 > 0 )
            cu_chroma_qp_offset_idx           ae(v)
} </ADD>
```

In the above syntax elements, the syntax elements tu_cbf_cb and tu_cbf_cr indicate whether there are any residual values for a Cb chroma block or the Cr chroma block. If there are no residual values, then no quantization or inverse quantization is needed. However, if there are residual values for the Cb chroma block or the Cr chroma block, then video encoder 200 may determine quantization parameters for quantizing and video decoder 300 may determine quantization parameters for inverse quantizing.

As described above and in more detail below, this disclosure describes examples of block level quantization parameter offsets for determining the quantization parameter for a chroma block. Because the example quantization parameter offsets are at the block level, the block level quantization parameter offsets may be considered as being at the CU level.

In the above syntax elements, cu_chroma_qp_offset_enabled_flag indicates whether block level quantization parameter offsets are enabled or not (e.g., for blocks in a slice or a picture). The cu_chroma_qp_offset_flag indicates whether block level quantization parameter offsets are enabled or not for a particular chroma block. For example, if cu_chroma_qp_offset_enabled_flag is true, it means that it is possible for the quantization parameter of a chroma block to be determined based on a block level quantization parameter offset. However, it does not necessarily mean that the quantization parameter of a particular chroma block is to be determined based on a block level quantization parameter offset. The cu_chroma_qp_offset_flag may indicate whether the quantization parameter of a particular chroma block is to be determined based on a block level quantization parameter offset.

If the quantization parameter of a particular chroma block is to be determined based on a block level quantization parameter offset (e.g., cu_chroma_qp_offset_flag is true), then video encoder 200 may signal and video decoder 300 may receive the cu_chroma_qp_offset_idx, which is an index into a list of quantization parameter offsets, referred to as cb_qp_offset_list for the Cb chroma block and cr_qp_offset_list for the Cr chroma block. The cu_chroma_qp_offset_idx may identify a block level quantization parameter offset, and video encoder 200 and video decoder 300 may utilize the block level quantization parameter offset to determine the quantization parameter for the chroma block. In one or more examples, the same cu_chroma_qp_offset_idx may be used to identify the block level quantization parameter offset for the Cb chroma block from cb_qp_offset_list and to identify the block level quantization parameter offset for the Cr chroma block from cr_qp_offset_list.

In other words, a chroma QP offset index (e.g., cu_chroma_qp_offset_idx) is signaled at CU level (e.g., block level). Video decoder 300 may use this index to determine the block level quantization parameter offset. The Cb block level quantization parameter offset for a Cb chroma block may be referred to as CuQpOffsetCb. The Cr block level quantization parameter offset for a Cr chroma block may be referred to as CuQpOffsetCr. The JointCbCr block level quantization parameter offset for a JointCbCr chroma block may be referred to as CuQpOffsetJointCbCr. CuQpOffsetCb, CuQpOffsetCr, and CuQpOffsetJointCbCr are identified from the list of quantization parameter offsets, which may be a lookup table.

In some examples, even if block level quantization parameter offset is to be used for a particular block, video encoder 200 may not signal and video decoder 300 may not receive an index into the list of quantization parameter offsets. For example, if the size of list of quantization parameter offsets is only one, then video encoder 200 and video decoder 300 may implicitly determine that the index into the list of quantization parameter offsets is the first entry in the list of quantization parameter offsets without needing to signal any index.

In one example, the chroma QP offset lookup table (e.g., the list of quantization parameter offsets) can be predefined in both video encoder 200 and video decoder 300 or signaled from video encoder 200 to video decoder 300 at sequence level, picture level, or slice level. For example, this value can be signaled in a Sequence Parameter Set (SPS), a Picture Parameter Set (PPS), and/or a Slice header (SH). That is, the values that make the list of quantization parameter offset (e.g., cb_qp_offset_list, cr_qp_offset_list, or joint_cbcr_qp_offset_list) may be pre-stored in video encoder 200 and video decoder 300 or video encoder 200 may signal and video decoder 300 may receive the values in an SPS, PPS, and/or SH.

The following describes example ways in which the block level quantization parameter offset is utilized to determine the quantization parameter for a chroma block. The block level quantization parameter offset may be CuQpOffsetCb, CuQpOffsetCr, and CuQpOffsetJointCbCr that are identified from respective lists of quantization parameter offsets (e.g., cb_qp_offset_list, cr_qp_offset_list, or joint_cbcr_qp_offset_list) based on a signaled index (e.g., cu_chroma_qp_offset_idx).

In one example, the variables $qPi_{Cb}$, $qPi_{Cr}$ and $qPi_{CbCr}$ can be derived as follows:

$qPi_{Cb}$=Clip3(-QpBdOffset$_C$,69,$Qp_Y$+pps_cb_qp_offset+slice_cb_qp_offset+ . . . +CuQpOffsetCb)

$qPi_{Cr}$=Clip3(-QpBdOffset$_C$,69,$Qp_Y$+pps_cr_qp_offset+slice_cr_qp_offset+ . . . +CuQpOffsetCr)

$qPi_{CbCr}$=Clip3(-QpBdOffset$_C$,69,$Qp_Y$+pps_joint_cbcr_qp_offset+slice_joint_cbcr_qp_offset+ . . . +CuQpOffsetJointCbCr)

In the above, CuQpOffsetCb=cb_qp_offset_list[cu_chroma_qp_offset_idx] is the CU level QP offset for Cb and CuQpOffsetCr=cr_qp_offset_list[cu_chroma_qp_offset_idx] is the CU level QP offset for Cr, and CuQpOffsetJointCbCr=joint_cbcr_qp_offset_list[cu_chroma_qp_offset_idx] is the CU level QP offset for joint CbCr. For example, to determine CuQpOffsetCb (e.g., block level quantization parameter offset for Cb chroma block), video encoder 200 and video decoder 300 may construct a list of quantization parameter offsets (e.g., cb_qp_offset_list). Video encoder 200 may signal an index (e.g., cu_chroma_qp_offset_idx) into the list of quantization parameter offsets. Video decoder 300 may determine that the value stored in cb_qp_offset_list[cu_chroma_qp_offset_idx] is equal to CuQpOffsetCb. To determine CuQpOffsetCr (e.g., block level quantization parameter offset for Cr chroma block), video encoder 200 and video decoder 300 may construct a list of quantization parameter offsets (e.g., cr_qp_offset_list). Video encoder 200 may signal an index (e.g., cu_chroma_qp_offset_idx) into the list of quantization parameter offsets. Video decoder 300 may determine that the value stored in cr_qp_offset_list[cu_chroma_qp_offset_idx] is equal to CuQpOffsetCr. In this example, the same index (e.g., cu_chroma_qp_offset_idx) is used to identify the block level quantization parameter offset for the Cb chroma block and the Cr chroma block. To determine CuQpOffsetJointCbCr (e.g., block level quantization parameter offset for JointCbCr chroma block), video encoder 200 and video decoder 300 may construct a list of quantization parameter offsets (e.g., jointcbcr_qp_offset_list). Video encoder 200 may signal an index (e.g., cu_chroma_qp_offset_idx) into the list of quantization parameter offsets. Video decoder 300 may determine that the value stored in jointcbcr_qp_offset_list[cu_chroma_qp_offset_idx] is equal to CuQpOffsetJointCbCr.

As described above, the equations to determine the quantization parameter for the Cb chroma block, Cr chroma block, and JointCbCr chroma block may be as follows:

$qPi_{Cb}$=Clip3(-QpBdOffset$_C$,69,$Qp_Y$+pps_cb_qp_offset+slice_cb_qp_offset+ . . . +CuQpOffsetCb)

$qPi_{Cr}$=Clip3(-QpBdOffset$_C$,69,$Qp_Y$+pps_cr_qp_offset+slice_cr_qp_offset+ . . . +CuQpOffsetCr)

$qPi_{CbCr}$=Clip3(-QpBdOffset$_C$,69,$Qp_Y$+pps_joint_cbcr_qp_offset+slice_joint_cbcr_qp_offset+ . . . +CuQpOffsetJointCbCr)

Accordingly, in accordance with one or more examples described in this disclosure, video decoder 300 may be configured to determine a quantization parameter predictor for a chroma block of video data based on a quantization parameter for a corresponding luma block. As one example, the quantization parameter predictor is $Qp_Y$, and may be the quantization parameter for a corresponding luma block or average of plurality of corresponding luma blocks. In some examples, the quantization parameter predictor may be determined based on $Qp_Y$ without necessarily being equal to $Qp_Y$. For example, the $Qp_Y$ may form as a value into a look up table from which the quantization parameter predictor is determined. The quantization parameter predictor may be different for the different chroma components or may be the same for the different chroma components.

Video decoder 300 may determine a block level quantization parameter offset for the chroma block. Examples of the block level quantization parameter offset include CuQpOffsetCb for the Cb chroma block, CuQpOffsetCr for the Cr chroma block, and CuQpOffsetJointCbCr for the JointCbCr chroma block.

In one or more examples, the block level quantization parameter offset is different for at least one other chroma block in same slice or picture as the chroma block and is determined on a chroma block-by-chroma block basis. For instance, a first chroma block in a slice or picture may have a different block level quantization parameter offset as a second chroma block in the same slice or picture, and the block level quantization parameter offset for the first block and the second block may be determined on a chroma block-by-chroma block basis.

As one example, the first chroma block may be of a first chroma component (e.g., Cb chroma block or Cr chroma block) and the second chroma block may be of a second chroma component (e.g., the other of Cb chroma block or Cr chroma block). In this example, video decoder 300 may determine a first block level quantization parameter offset for the first chroma block of the first chroma component and determine a second block level quantization parameter offset for the second chroma block of the second chroma component. The first block level quantization parameter offset and the second block level quantization parameter offset may be different.

In the above example, the first chroma block and the second chroma block are of the same CU. However, in some examples, the first chroma block and the second chroma block may be of different CUs, and the block level quantization parameter offset for the first chroma block and the second chroma block of different CUs may be different.

There may be various ways in which video decoder 300 may determine the block level quantization parameter offset. For example, video decoder 300 may construct a list of quantization parameter offsets (e.g., cb_qp_offset_list, cr_qp_offset_list, and/or joint_cbcr_qp_offset_list), where the values for the list of quantization parameter offsets may be pre-stored or signaled. Video decoder 300 may receive an index into the list of quantization parameter offsets (e.g., cu_chroma_qp_offset_idx). Video decoder 300 may determine the block level quantization parameter offset based on the index into the list of quantization parameter offsets. For example, video decoder 300 may determine that cb_qp_offset_list[cu_chroma_qp_offset_idx] is the CU level QP offset for Cb and CuQpOffsetCr=cr_qp_offset_list[cu_chroma_qp_offset_idx] is the CU level QP offset for Cr, and CuQpOffsetJointCbCr=joint_cbcr_qp_offset_list[cu_chroma_qp_offset_idx] is the CU level QP offset for JointCbCr.

In one or more examples, where a first chroma block and a second chroma block are of the same CU, the index into respective lists of quantization parameter offsets may be the same. For example, cu_chroma_qp_offset_idx is the index for both cb_qp_offset_list and cr_qp_offset_list. That is, video decoder 300 may be configured to determine a first block level quantization parameter offset from an index into a first list of quantization parameter offsets for the first chroma component (e.g., determine CuQpOffsetCb based on cu_chroma_qp_offset_idx into cb_qp_offset_list), and determine the second block level quantization parameter offset from the same index into a second list of quantization parameter offsets for the second chroma component (e.g., determine CuQpOffsetCr based on cu_chroma_qp_offset_idx into cr_qp_offset_list).

Video decoder 300 may determine a quantization parameter for the chroma block based on the block level quantization parameter offset and the quantization parameter predictor. For example, video decoder 300 may receive at least one of a first quantization parameter offset for chroma component in a picture parameter set (e.g., pps_cb_qp_offset for Cb chroma block or pps_cr_qp_offset for Cr chroma block) or a second quantization parameter offset for chroma component in a slice parameter set (e.g., slice_cb_qp_offset for Cb chroma block or slice_cr_qp_offset for Cr chroma block signaled in slice header).

Video decoder 300 may determine the quantization parameter for the chroma block by adding the block level quantization parameter offset and one or both of the first quantization parameter offset and the second quantization parameter offset. For example, as described above:

$qPi_{Cb}$=Clip3(-QpBdOffset$_C$,69,$Qp_Y$+pps_cb_qp_offset+slice_cb_qp_offset+ ... +CuQpOffsetCb)

$qPi_{Cr}$=Clip3(-QpBdOffset$_C$,69,$Qp_Y$+pps_cr_qp_offset+slice_cr_qp_offset+ ... +CuQpOffsetCr)

$qPi_{CbCr}$=Clip3(-QpBdOffset$_C$,69,$Qp_Y$+pps_joint_cbcr_qp_offset+slice_joint_cbcr_qp_offset+ ... +CuQpOffsetJointCbCr).

Video decoder 300 may determine a residual block based on the quantization parameter. For example, video decoder 300 may inverse-quantize a plurality of coefficient values based on the quantization parameter to generate inverse-quantized coefficient values and inverse-transform the inverse-quantized coefficient values to generate the residual block. In some examples, such as transform skip mode, inverse-transform may be skipped.

Video decoder 300 may reconstruct the chroma block based on the residual block. For example, video decoder 300 may determine a prediction block for the chroma block and add the residual block to the prediction block for reconstructing the chroma block.

In the above example, video decoder 300 is described as determining the block level quantization parameter offset for the chroma block. However, in some cases, it may be possible that determining block level quantization parameter offset for a particular chorma block is disabled. Accordingly, in one or more examples, video decoder 300 may receive a syntax element (e.g., cu_chroma_qp_offset_flag) indicating that the block level quantization parameter offset is to be used for determining the block level quantization parameter offset for the chroma block. In such examples, video decoder 300 may determine the block level quantization parameter offset based on the syntax element indicating that the block level quantization parameter offset is to be used (e.g., based on cu_chroma_qp_offset_flag being true).

In accordance with one or more examples described in this disclosure, video encoder 200 may be configured to determine a quantization parameter predictor for a chroma block of video data based on a quantization parameter for a corresponding luma block. As one example, the quantization parameter predictor is $Qp_Y$, and may be the quantization parameter for a corresponding luma block or average of plurality of corresponding luma blocks. In some examples, the quantization parameter predictor may be determined based on $Qp_Y$ without necessarily being equal to $Qp_Y$. For example, the $Qp_Y$ may form as a value into a look up table from which the quantization parameter predictor is determined. The quantization parameter predictor may be different for the different chroma components or may be the same for the different chroma components.

Video encoder 200 may determine a block level quantization parameter offset for the chroma block. Examples of the block level quantization parameter offset include CuQpOffsetCb for the Cb chroma block, CuQpOffsetCr for the Cr chroma block, and CuQpOffsetJointCbCr for the JointCbCr chroma block.

Video encoder 200 may construct a list of quantization parameter offsets (e.g., cb_qp_offset_list, cr_qp_offset_list, and/or joint_cbcr_qp_offset_list), where the values for the list of quantization parameter offsets may be pre-stored or signaled. Video encoder 200 may signal an index into the list of quantization parameter offsets (e.g., cu_chroma_qp_offset_idx).

In one or more examples, where a first chroma block and a second chroma block are of the same CU, the index into respective lists of quantization parameter offsets may be the same. For example, cu_chroma_qp_offset_idx is the index for both cb_qp_offset_list and cr_qp_offset_list.

Video encoder 200 may determine a quantization parameter for the chroma block based on the block level quantization parameter offset and the quantization parameter predictor. For example, video encoder 200 may determine at least one of a first quantization parameter offset for chroma component in a picture parameter set (e.g., pps_cb_qp_offset for Cb chroma block or pps_cr_qp_offset for Cr chroma block) or a second quantization parameter offset for chroma component in a slice parameter set (e.g., slice_cb_qp_offset for Cb chroma block or slice_cr_qp_offset for Cr chroma block signaled in slice header).

Video encoder 200 may determine the quantization parameter for the chroma block by adding the block level quantization parameter offset and one or both of the first quantization parameter offset and the second quantization parameter offset. For example, as described above:

$qPi_{Cb}$=Clip3(-QpBdOffset$_C$,69,$Qp_Y$+pps_cb_qp_offset+slice_cb_qp_offset+ ... +CuQpOffsetCb)

$qPi_{Cr}$=Clip3(-QpBdOffset$_C$,69,$Qp_Y$+pps_cr_qp_offset+slice_cr_qp_offset+ ... +CuQpOffsetCr)

$qPi_{CbCr}$=Clip3(-QpBdOffset$_C$,69,$Qp_Y$+pps_joint_cbcr_qp_offset+slice_joint_cbcr_qp_offset+ ... +CuQpOffsetJointCbCr).

Video encoder 200 may quantize coefficient values for a residual block based on the determined quantization parameter for the chroma block. For example, video encoder 200 may generate the coefficient values for the residual block using a tranform (although transform skip is possible) and quantize coefficient values based on the quantization parameter to generate quantized coefficient values. Video encoder 200 may signal information indicative of the quantized coefficient values.

In the above example, video encoder 200 is described as determining the block level quantization parameter offset for the chroma block. However, in some cases, it may be possible that determining block level quantization parameter offset for a particular chorma block is disabled. Accordingly, in one or more examples, video encoder 200 may signal a syntax element (e.g., cu_chroma_qp_offset_flag) indicating that the block level quantization parameter offset is to be used for determining the block level quantization parameter offset for the chroma block.

In some examples, video encoder 200 may signal and video decoder 300 may receive CU level chroma delta QP for chroma components. As one example, video encoder 200 may signal CU level chroma delta QP for chroma components when dual tree is enabled. In this example, a chroma delta QP value may be signaled using both absolute value for chroma delta QP and sign values for chroma delta QP for both Cb and Cr components. The variables $qPi_C$, $qPi_{Cr}$ and $qPi_{CbCr}$ can be derived as follows:

$qPi_{CbCr}$=Clip3(-QpBdOffset$_C$,69,$Qp_Y$+pp-s_cb_qp_offset+slice_cb_qp_offset+ . . . ChromaCuQpDeltaVal+CuQpOffsetCb)

$qPi_{Cr}$=Clip3(-QpBdOffset$_C$,69,$Qp_Y$+pps_cr_qp_offset+slice_cr_qp_offset+ . . . ChromaCuQpDeltaVal+CuQpOffsetCr)

$qPi_{CbCr}$=Clip3(-QpBdOffset$_C$,69,$Qp_Y$+pps_joint_cbcr_qp_offset+slice_joint_c bcr_qp_offset+ . . . ChromaCuQpDeltaVal+CuQpOffsetJointCbCr)

In the above, ChromaCuQpDeltaVal=chroma_cu_qp_delta_abs*(1-2*chroma_cu_qp_delta_sign_flag). CuQpOffsetCb=cb_qp_offset_list[cu_chroma_qp_offset_idx] is the CU level QP offset for Cb and CuQpOffsetCr=cr_qp_offset_list[cu_chroma_qp_offset_idx] is the CU level QP offset for Cr, and CuQpOffsetJointCbCr=joint_cbcr_qp_offset_list[cu_chroma_qp_offset_idx] is the CU level QP offset for joint CbCr. In this example, video encoder 200 and video decoder 300 may use both PPS, slice and CU level QP offsets for chroma when dual tree is enabled.

Partial syntax is as below. <ADD> . . . </ADD> shows addition and <DELETE> . . . </DELETE> shows deletion.

| | Descriptor |
|---|---|
| transform_unit( x0, y0, tbWidth, tbHeight, treeType, subTuIndex) { | |
| ... | |
| <ADD> If(treeType != DUAL_TREE_CHROMA) {</ADD> | |
|   if( ((tu_cbf_luma[ x0 ] [ y0 ]  \|\| | |
|   tu_cbf_cb[ x0 ][ y0 ]  \|\| | |
| tu_cbf_cr[ x0 ][ y0 ]) <DELETE>&& | |
|     treeType != DUAL_TREE_CHROMA | |
| </DELETE> && <ADD> treeType != | |
| DUAL_TREE_LUMA) | |
|   \|\| (tu_cbf_luma[ x0 ][ y0 ] && treeType == | |
|   DUAL_TREE_LUMA</ADD>)) { | |
|     if( cu_qp_delta_enabled_flag | |
|     && !IsCuQpDeltaCoded) { | |
|       cu_qp_delta_abs | ae(v) |
|       if( cu_qp_delta_abs) | |
|         cu_qp_delta_sign_flag | ae(v) |
|     } | |
|   } | |
| <ADD>} | |
| If(( tu_cbf_cb[ x0 ][ y0 ] \|\| tu_cbf_cr[ x0 ] [ y0 ]) && | |
|   cu_chroma_qp_offset_enabled_flag | |
|   && !IsCuChromaQpOffsetCoded) { | |
|   cu_chroma_qp_offset_flag | ae(v) |
|   if( cu_chroma_qp_offset_flag && | |
|   chroma_qp_offset_list_len_minus1 > 0) | |
|     cu_chroma_qp_offset_idx | ae(v) |
|   if(treeType = = DUAL_TREE_CHROMA && | |
|   cu_chroma_qp_offset_flag) { | |
|     chroma_cu_qp_delta_abs | ae(v) |
|     if( chroma_cu_qp_delta_abs) | |
|       chroma_cu_qp_delta_sign_flag | ae(v) |
|   } | |
| } </ADD> | |
| ... | |
| } | |

In some examples, video encoder 200 may signal and video decoder 300 may receive chroma delta QPs for chroma components Cb and Cr and joint_CbCr separately. In one example, in order to provide more flexible, in the example, the delta QPs for chroma components Cb and Cr and joint_CbCr are signaled separately. In the example, a chroma delta QP value is signaled using both absolute value for chroma delta QP and sign values for chroma delta QP for both Cb and Cr components. Variables $qPi_{Cr}$ and $qPi_{Cr}$ and $qPi_{CbCr}$ can be derived as follows:

$qPi_{Cb}$=Clip3(-QpBdOffset$_C$,69,$Qp_Y$+pps_cb_qp_offset+slice_cb_qp_offset+ . . . ChromaCuQpDeltaVal)

$qPi_{Cr}$=Clip3(-QpBdOffset$_C$,69,$Qp_Y$+pps_cr_qp_offset+slice_cr_qp_offset+ . . . ChromaCuQpDeltaVal)

$qPi_{CbCr}$=Clip3(-QpBdOffset$_C$,69,$Qp_Y$+pps_joint_cbcr_qp_offset+slice_joint_c bcr_qp_offset+ . . . ChromaCuQpDeltaVal)

Partial syntax is as below. <ADD> . . . </ADD> shows addition and <DELETE> . . . </DELETE> shows deletion.

| | Descriptor |
|---|---|
| transform_unit( x0, y0, tbWidth, tbHeight, treeType, subTuIndex) { | |
| ... | |
| <ADD> If(treeType != DUAL_TREE_CHROMA) { </ADD> | |
|   if(  (tu_cbf_luma[ x0 ][ y0 ]  \|\| | |
|   tu_cbf_cb[ x0 ][y0 ]  \|\| | |
| tu_cbf_cr[ x0 ][ y0 ]) <DELETE>&& | |
|     treeType != DUAL_TREE_CHROMA | |
| </DELETE> && <ADD> treeType != | |
| DUAL_TREE_LUMA) | |
|   \|\| (tu_cbf_luma[ x0 ] [ y0 ] && treeType == | |
|   DUAL_TREE_LUMA </ADD>)) { | |
|     if( cu_qp_delta_enabled_flag | |
|     && !IsCuQpDeltaCoded) { | |
|       cu_qp_delta_abs | ae(v) |
|       if( cu_qp_delta_abs) | |
|         cu_qp_delta_sign_flag | ae(v) |
|     } | |
|   } | |

| | Descriptor |
|---|---|
| <ADD>... | |
|     if( tu_cbf_cr[ x0 ] [ y0 ]) { | |
|       if( tu_cbf_cb[ x0 ] [ y0 ]) | |
|         tu_joint_cbcr_residual[ x0 ][ y0 ] | ae(v) |
| ... | |
| If (treeType != DUAL_TREE_LUMA) { | |
|   if( chroma_cu_qp_delta_enabled_flag | |
|   && !IsChromaCuQpDeltaCoded) | |
| { | |
|   If (tu_joint_cbcr_residual[x0][y0]) { | |
|       cbcr_cu_qp_delta_abs | ae(v) |
|       if( cbcr_cu_qp_delta_abs) | |
|         cbcr_cu_qp_delta_sign_flag | ae(v) |
|   } else { | |
|     if(tu_cbf_cb[ x0 ][ y0 ]) { | |
|       cb_cu_qp_delta_abs | ae(v) |
|       if( cb_cu_qp_delta_abs) | |
|         cb_cu_qp_delta_sign_flag | ae(v) |
| } | |
|     if(tu_cbf_cr[ x0 ] [ y0 ]) { | |
|       cr_cu_qp_delta_abs | ae(v) |
|       if( cr_cu_qp_delta_abs) | |
|         c_cu_qp_delta_sign_flag | ae(v) |
|     } | |
|   } | |
|     } | |
|   } | |
| } </ADD> | |
| ... | |
| } | |

In one example, the condition of signaling the cu level chroma delta QP and cu level chroma QP offset depends on the CBF flag of the components. For example, video encoder 200 may only signal delta QP and/or QP offset when the CBF of corresponding component is true (e.g. equal to 1).

In one example, if the size of chroma coding block equals to or is bigger than a predefined size (for example, virtual pipeline data unit (VPDU) size, or 32×32), video encoder 200 may signal the chroma delta QP and/or chroma QP offset at the first coding block, no matter the CBF of the first CB is 0 or 1. The specified size can be predefined in both encoder side and decoder side, or set as a value signaled from video encoder 200 to video decoder 300 at sequence level, picture level, slice level. For example, this value can be signaled in Sequence Parameter Set (SPS), Picture Parameter Set (PPS), Slice header (SH). In one example, when dual tree is enabled, video encoder 200 may signal the cu level chroma delta QP and/or cu level chroma QP offset no matter the cbf of chroma component is 0 or 1.

Figure 3:
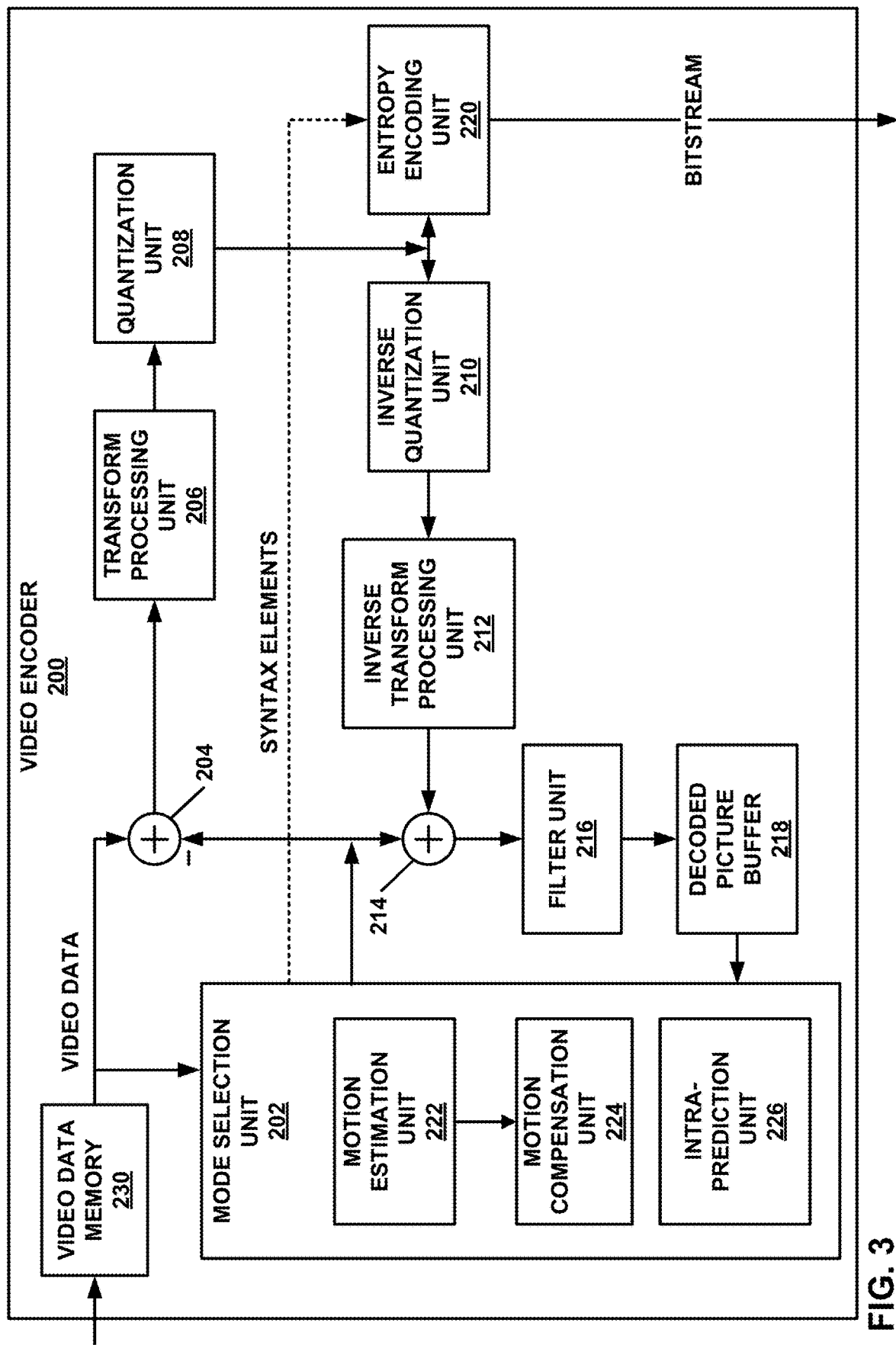
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. In other examples, video encoder 200 may include more, fewer, or different units.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

In accordance with one or more examples described in this disclosure, mode selection unit 202 may be configured to determine a quantization parameter predictor for a chroma block of the video data based on a quantization parameter for a corresponding luma block. For example, mode selection unit 202 may have determined a quantization parameter for the corresponding luma block or plurality of corresponding luma blocks, and the quantization parameter for the corresponding luma block or some average of the quantization parameters for the plurality of corresponding luma blocks may form the quantization parameter predictor. The quantization parameter predictor may be referred to as $Qp_Y$. However, in some examples, the quantization parameter predictor may be determined from the quantization parameter for the corresponding luma block (e.g., the quantization parameter predictor is determined from $Qp_Y$).

Mode selection unit 202 may determine a block level quantization parameter offset for the chroma block. The chroma block may be Cb chroma block, Cr chroma block, or a JointCbCr chroma block. Examples of the block level quantization parameter offsets include CuOffsetCb for the Cb chroma block, CuOffsetCr for the Cr chroma block, and CuQpOffsetJointCbCr for the JointCbCr chroma block.

In some examples, mode selection unit 202 may first determine if block level quantization parameter offset for the particular chroma block should be enabled. If mode selection unit 202 determines that block level quantization parameter offset is enabled for the chroma block, mode selection unit 202 may determine that the cu_chroma_qp_offset_flag is true, and cause entropy encoding unit 220 to signal information indicating that cu_chroma_qp_offset_flag is true.

Mode selection unit 202 may construct a list of quantization parameter offsets. Mode selection unit 202 may determine an index into the list of quantization parameter offsets for the determined block level quantization parameter offset. Entropy encoding unit 220 may signal information indicative of the index. Example of the index includes cu_chroma_qp_off_idx.

Mode selection unit 202 may determine a quantization parameter for the chroma block based on the block level quantization parameter offset and the quantization parameter predictor. As one example, mode selection unit 202 may determine a first quantization parameter offset (e.g., pps_cb_qp_offset, pps_cr_qp_offset, or pps_joint_cbcr_qp_offset) in a picture parameter set and a second quantization parameter offset (e.g., slice_cb_qp_offset, slice_cr_qp_offset, or slice_joint_cbcr_qp_offset). Mode selection unit 202 may add the first quantization parameter, second quantization parameter, and the block level quantization parameter offset, and clip the result to within a certain range to determine the quantization parameter for the chroma block.

Quantization unit 208 may quantize coefficient values for a residual block based on the determined quantization parameter for the chroma block. Entropy encoding unit 220 may signal information indicative of the quantized coefficient values.

In the above examples, mode selection unit 202, quantization unit 208, and entropy encoding unit 220 are described as performing the example techniques. However, any one or combination of components of video encoder 200 may be configured to perform the example techniques.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
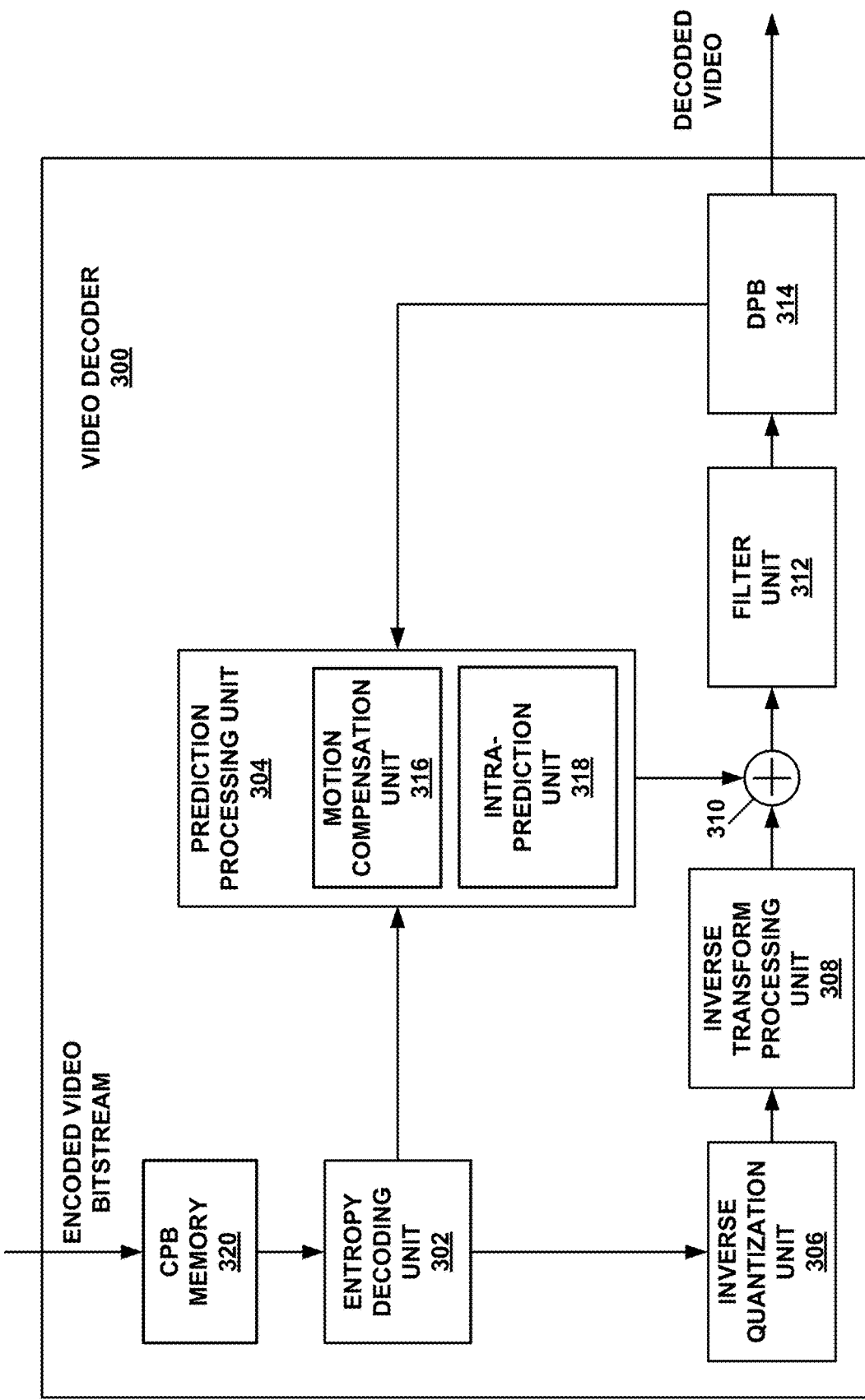
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions. In other examples, video decoder 300 may include more, fewer, or different units.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In one or more examples, prediction processing unit 304 and inverse quantization unit 306, along with reconstruction unit 310 may be configured to perform one or more example techniques described in this disclosure. For example, prediction processing unit 304 may determine a quantization parameter predictor for a chroma block of the video data based on a quantization parameter for a corresponding luma block. For example, prediction processing unit 304 may have determined a quantization parameter for the corresponding luma block or plurality of corresponding luma blocks, and determined the quantization parameter predictor for the chroma block based on the quantization parameter for the corresponding luma block or plurality of corresponding luma blocks. One example of the quantization parameter predictor is referred to as $Qp_Y$. However, in some examples, the quantization parameter predictor may be determined from the quantization parameter for the corresponding luma block (e.g., the quantization parameter predictor is determined from $Qp_Y$).

Prediction processing unit 304 may determine whether block level quantization parameter offset is enabled for the chroma block. For example, prediction processing unit 304 may receive a syntax element (e.g., cu_chroma_qp_offset_flag) indicating that the block level quantization parameter offset is to be used for determining the block level quantization parameter offset for the chroma block. Prediction processing unit 304 may determine a block level quantization parameter offset for the chroma block. For example, prediction processing unit 304 may determine the block level quantization parameter offset based on the syntax element indicating that the block level quantization parameter offset is to be used.

As one example, prediction processing unit 304 may construct a list of quantization parameter offsets (e.g., cb_qp_offset_list, cr_qp_offset_list, and/or joint_cbcr_qp_offset_list) and receive an index (e.g., cu_chroma_qp_offset_idx) into the list of quantization parameter offsets. Prediction processing unit 304 may determine the block level quantization parameter offset based on the index into the list of quantization parameter offsets. Examples of the block level quantization parameter offset include CuQpOffsetCb, CuQpOffsetCr, and CuQpOffsetJointCbCr.

The chroma block may be a first chroma block of a first chroma component (e.g., Cb chroma block) and the list of quantization parameter offsets may be a first list of quantization parameter offsets (e.g., cb_qp_offset_list). Prediction processing unit 304 may also construct a list of quantization parameter offsets (e.g., cr_qp_offset_list) for a second chroma block of a second chroma component (e.g., Cr chroma block). In one or more examples, prediction processing unit 304 may utilize the same index (cu_chroma_qp_offset_idx) to determine the block level quantization parameter offset for the first chroma block and to determine the block level quantization parameter offset for the second chroma block (e.g., cu_chroma_qp_offset_idx is an index in cb_qp_offset_list and cr_qp_offset_list).

In one or more examples, the block level quantization parameter offset may be different for different chroma blocks in the same picture or slice. For example, the block level quantization parameter offset may be determined on a chroma block-by-chroma block basis. For instance, prediction processing unit 304 may determine the block level quantization parameter for a first chroma block in a slice or picture, and determine the block level quantization parameter for a second chroma block in the same slice or picture, where the two block level quantization parameters may be different.

Prediction processing unit 304 may determine a quantization parameter for the chroma block based on the block level quantization parameter offset and the quantization parameter predictor. For example, prediction processing unit 304 may receive at least one of a first quantization parameter offset for chroma component (e.g., pps_cb_qp_offset, pps_cr_qp_offset, or pps_joint_cbcr_qp_offset) in a picture parameter set or a second quantization parameter offset for chroma component (e.g., slice_cb_qp_offset, slice_cr_qp_offset, or slice_joint_cbcr_qp_offset) in a slice parameter set (e.g., slice header). Prediction processing unit 304 may determine the quantization parameter for the chroma block based on the block level quantization parameter offset, at least one of the first quantization parameter offset or the second quantization parameter offset, and the quantization parameter predictor.

For example, prediction processing unit 304 may perform the following operations to determine the block level quantization parameter offset, examples of which include $qPi_{Cb}$, $qPi_{Cr}$, and $qPi_{CbCr}$.

$$qPi_{Cb}=\text{Clip3}(-\text{QpBdOffset}_C,69,Qp_Y+pps\_cb\_qp\_\text{off-}\\\text{set}+slice\_cb\_qp\_\text{offset}+ \ldots +\text{CuQpOffsetCb})$$

$$qPi_{Cr}=\text{Clip3}(-\text{QpBdOffset}_C,69,Qp_Y+pps\_cr\_qp\_\text{off-}\\\text{set}+slice\_cr\_qp\_\text{offset}+ \ldots +\text{CuQpOffsetCr})$$

$$qPi_{CbCr}=\text{Clip3}(-\text{QpBdOffset}_C,69,Qp_Y+\\pps\_\text{joint}\_cbcr\_qp\_\text{offset}+\\slice\_\text{joint}\_cbcr\_qp\_\text{offset}+ \ldots +\text{CuQpOff-}\\\text{setJointCbCr}).$$

Inverse quantization unit 306 and inverse transform processing unit 308 may determine a residual block based on the quantization parameter. For example, inverse quantization unit 306 may inverse-quantize (e.g., performing inverse-quantizing) a plurality of coefficient values based on the quantization parameter to generate inverse-quantized coefficient values. Inverse transform processing unit 308 may inverse-transform (e.g., performing inverse-transforming) the inverse-quantized coefficient values to generate the generate the residual block.

Reconstruction unit 310 may reconstruct the chroma block based on the residual block. For example, prediction processing unit 304 may determine a prediction block for the chroma block. Reconstruction unit 310 may add the residual block to the prediction block to reconstruct the chroma block.

Figure 6:
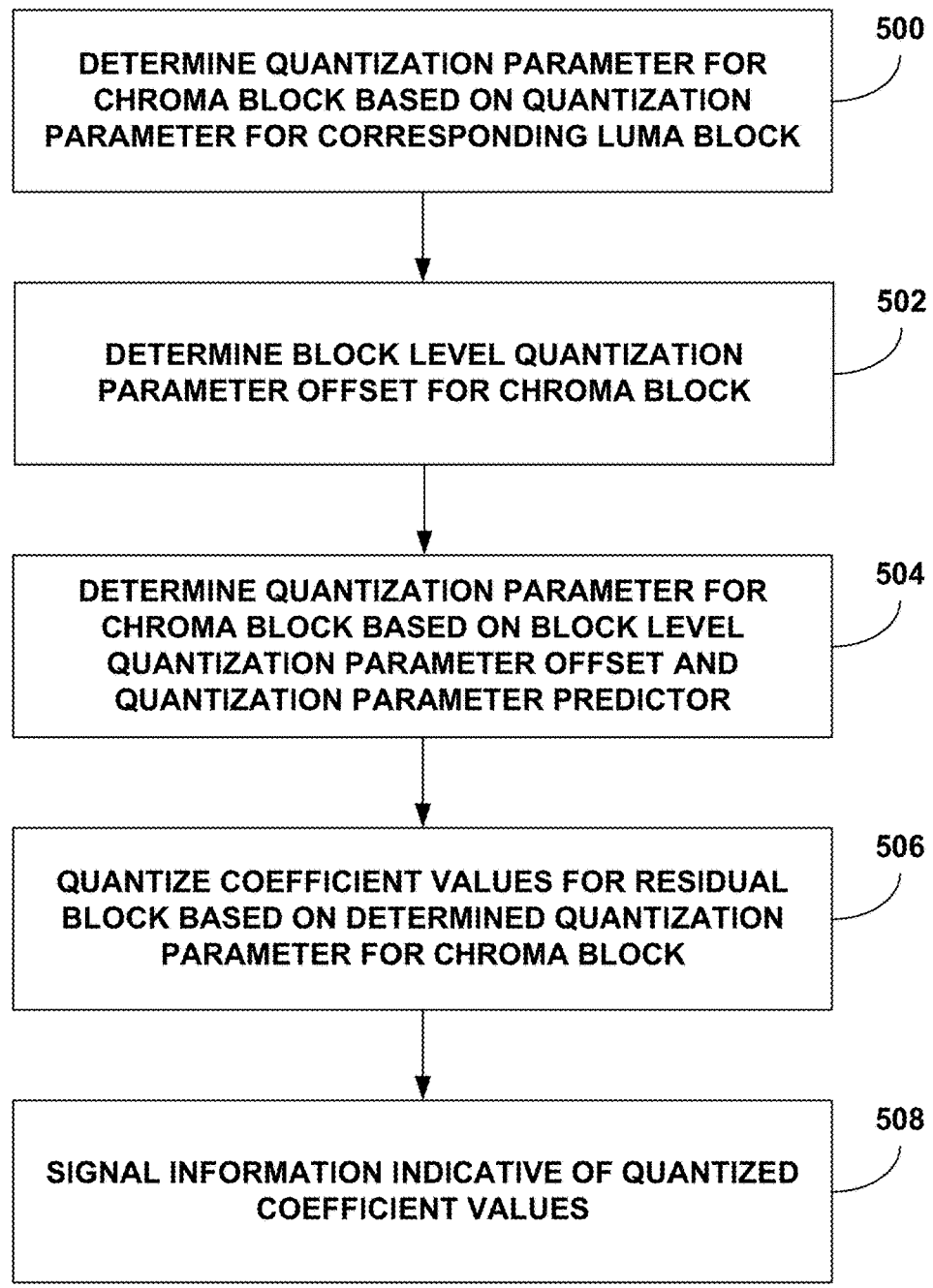
FIG. 6 is a flowchart illustrating an example method for encoding a current block of video data.

FIG. 6 is a flowchart illustrating an example method for encoding a current block. The current block may comprise a current CU. Although described with respect to video encoder 200 (FIGS. 1 and 3), it should be understood that other devices may be configured to perform a method similar to that of FIG. 6. The example techniques are described with respect to processing circuitry. Examples of the processing circuitry include the components of video encoder 200.

In one or more examples, memory (e.g., memory 106, video data memory 230, DPB 218, or some other memory) may be configured to store a quantization parameter for a corresponding luma block of a chroma block of the video data. For instance, the processing circuitry of video encoder 200 may have already determined the quantization parameter for the corresponding luma block and stored it in memory. The memory may be coupled to the processing circuitry of video encoder 200.

The processing circuitry of video encoder 200 may be configured to determine a quantization parameter predictor for a chroma block of the video data based on a quantization parameter for a corresponding luma block (500). For example, the processing circuitry may utilize the quantization parameter for the corresponding luma block as an input into a process to determine the quantization parameter predictor. In some examples, the quantization parameter predictor may be the quantization parameter of the corresponding luma block.

The processing circuitry of video encoder 200 may determine a block level quantization parameter offset for the chroma block (502). In some examples, the processing circuitry may construct a list of quantizaton parameter offsets and determine an index into the list of quantization parameter offsets for the determined block level quantization parameter offset. The processing circuitry may signal information indicative of the index.

The processing circuitry of video encoder 200 may determine a quantization parameter for the chroma block based on the block level quantization parameter offset and the quantization parameter predictor (504). In some examples, the processing circuitry may add the quantization parameter predictor, the block level quantization parameter offset, a first quantization parameter offset signaled in the PPS, and a second quantization parameter offset signaled in the slice parameter set (e.g., slice header) to determine the quantization parameter for the chroma block.

The processing circuitry may quantize coefficient values for a residual block based on the determined quantization parameter for the chroma block (506). The processing circuitry may then signal information indicative of the quantized coefficient values (508).

Figure 7:
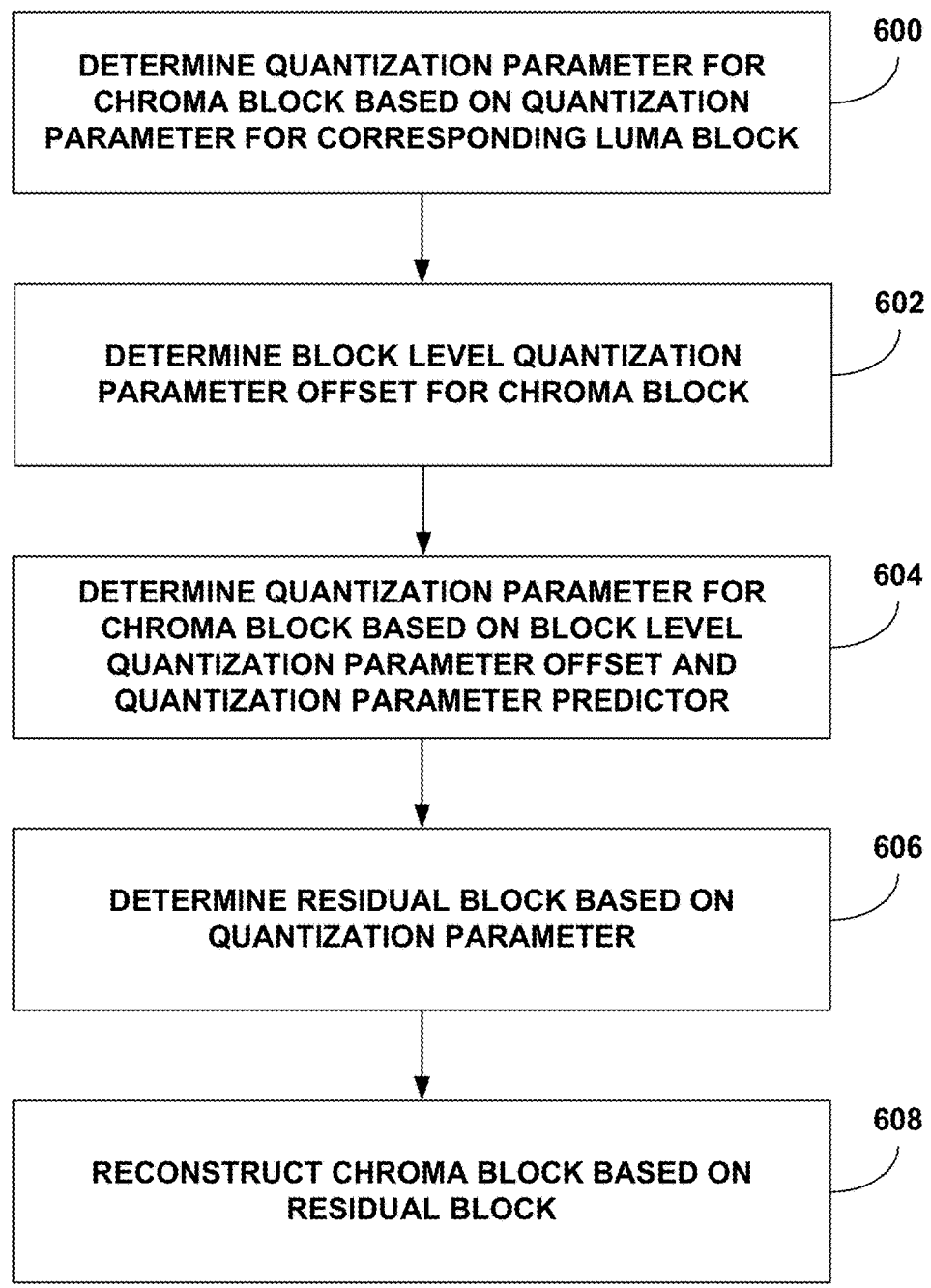
FIG. 7 is a flowchart illustrating an example method for decoding a current block of video data.

FIG. 7 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 7. The example techniques are described with respect to processing circuitry. Examples of the processing circuitry include the components of video decoder 300.

In one or more examples, memory (e.g., memory 120, CPB memory 320, DPB 314, or some other memory) may be configured to store a quantization parameter for a corresponding luma block of a chroma block of the video data. For instance, the processing circuitry of video decoder 300 may have already determined the quantization parameter for the corresponding luma block and stored it in memory. The memory may be coupled to the processing circuitry of video decoder 300.

The processing circuitry of video decoder 300 may be configured to determine a quantization parameter predictor for a chroma block of the video data based on a quantization parameter for a corresponding luma block (600). For example, the processing circuitry may utilize the quantization parameter for the corresponding luma block as an input into a process to determine the quantization parameter predictor. In some examples, the quantization parameter predictor may be the quantization parameter of the corresponding luma block.

The processing circuitry of video decoder 300 may determine a block level quantization parameter offset for the chroma block (602). In some examples, the processing circuitry may construct a list of quantizaton parameter offsets. The processing circuitry may receive an index into the list of quantization parameter offsets, and determine the block level quantization parameter offset based on the received index.

The processing circuitry of video decoder 300 may determine a quantization parameter for the chroma block based on the block level quantization parameter offset and the quantization parameter predictor (604). In some examples, the processing circuitry may add the quantization parameter predictor, the block level quantization parameter offset, a first quantization parameter offset received in the PPS, and a second quantization parameter offset received in the slice parameter set (e.g., slice header) to determine the quantization parameter for the chroma block.

The processing circuitry may determine a residual block based on the quantization parameter (606). For example, the processing circuitry may inverse-quantize a plurality of coefficient values based on the quantization parameter to generate inverse-quantized coefficient values, and inverse-transform the inverse-quantized coefficient values to generate the residual block. In some examples, inverse-transform may be skipped, such as for transform skip mode.

The processing circuitry may reconstruct the chroma block based on the residual block (608). For example, the processing circuitry may determine a prediction block for the chroma block and add the residual block to the prediction block to reconstruct the chroma block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a quantization parameter predictor for a first chroma block of a first chroma component and a second chroma block of a second chroma component of the video data based on a quantization parameter for a corresponding luma block;
   determining a first block level quantization parameter offset for the first chroma block from an index into a first list of quantization parameter offsets for the first chroma component;
   determining a first quantization parameter for the first chroma block based on the first block level quantization parameter offset and the quantization parameter predictor;
   determining a first residual block based on the first quantization parameter;
   reconstructing the first chroma block based on the first residual block;

determining a second block level quantization parameter offset, for the second chroma block, from the index into a second list of quantization parameter offsets for the second chroma component, wherein the index into the first list of quantization parameter offsets is same as the index into the second list of quantization parameter offsets;

determining a second quantization parameter for the second chroma block based on the second block level quantization parameter offset and the quantization parameter predictor;

determining a second residual block based on the second quantization parameter; and reconstructing the second chroma block based on the second residual block.

2. The method of claim 1, wherein determining the first block level quantization parameter offset comprises:
constructing the first list of quantization parameter offsets;
receiving the index into the first list of quantization parameter offsets; and
determining the first block level quantization parameter offset based on the index into the first list of quantization parameter offsets.

3. The method of claim 1, further comprising:
receiving at least one of a first quantization parameter offset for the first chroma component in a picture parameter set or a second quantization parameter offset for the first chroma component in a slice parameter set,
wherein determining the first quantization parameter for the first chroma block comprises determining the first quantization parameter for the first chroma block based on the first block level quantization parameter offset, at least one of the first quantization parameter offset or the second quantization parameter offset, and the quantization parameter predictor.

4. The method of claim 1, further comprising:
receiving a syntax element indicating that use of block level quantization parameter offsets is enabled,
wherein determining the first block level quantization parameter offset for the first chroma block comprises determining the first block level quantization parameter offset based on the syntax element indicating that the use of block level quantization parameter offsets is enabled.

5. The method of claim 1, wherein the first block level quantization parameter offset is different for at least one other chroma block in a same slice or picture as the first chroma block and is determined on a chroma block-by-chroma block basis.

6. The method of claim 1, wherein determining the first residual block based on the first quantization parameter comprises:
inverse-quantizing a plurality of coefficient values based on the first quantization parameter to generate inverse-quantized coefficient values; and
inverse-transforming the inverse-quantized coefficient values to generate the first residual block.

7. The method of claim 1, wherein reconstructing the first chroma block comprises:
determining a prediction block for the first chroma block; and
adding the first residual block to the prediction block to reconstruct the first chroma block.

8. A device for decoding video data, the device comprising:
memory configured to store a quantization parameter for a corresponding luma block of a first chroma block of a first chroma component and a second chroma block of a second chroma component of the video data; and
processing circuitry coupled to the memory and configured to:
determine a quantization parameter predictor for the first chroma block and the second chroma block of the video data based on the quantization parameter for the corresponding luma block;
determine a first block level quantization parameter offset, for the first chroma block, from an index into a first list of quantization parameter offsets for the first chroma component;
determine a first quantization parameter for the first chroma block based on the first block level quantization parameter offset and the quantization parameter predictor;
determine a first residual block based on the first quantization parameter;
reconstruct the first chroma block based on the first residual block;
determine a second block level quantization parameter offset, for the second chroma block, from the index into a second list of quantization parameter offsets for the second chroma component, wherein the index into the first list of quantization parameter offsets is same as the index into the second list of quantization parameter offsets;
determine a second quantization parameter for the second chroma block based on the second block level quantization parameter offset and the quantization parameter predictor;
determine a second residual block based on the second quantization parameter; and
reconstruct the second chroma block based on the second residual block.

9. The device of claim 8, wherein to determine the first block level quantization parameter offset, the processing circuitry is configured to:
construct the first list of quantization parameter offsets;
receive the index into the first list of quantization parameter offsets; and
determine the first block level quantization parameter offset based on the index into the first list of quantization parameter offsets.

10. The device of claim 8, wherein the processing circuitry is configured to:
receive at least one of a first quantization parameter offset for the first chroma component in a picture parameter set or a second quantization parameter offset for the first chroma component in a slice parameter set,
wherein to determine the first quantization parameter for the first chroma block, the processing circuitry is configured to determine the first quantization parameter for the first chroma block based on the first block level quantization parameter offset, at least one of the first quantization parameter offset or the second quantization parameter offset, and the quantization parameter predictor.

11. The device of claim 8, wherein the processing circuitry is configured to:
receive a syntax element indicating that use of block level quantization parameter offsets is enabled offset is to be used for determining the block level quantization parameter offset for the chroma block,
wherein to determine the first block level quantization parameter offset for the first chroma block, the processing circuitry is configured to determine the first block level quantization parameter offset based on the syntax element indicating that the use of block level quantization offsets is enabled.

12. The device of claim 8, wherein the first block level quantization parameter offset is different for at least one other chroma block in a same slice or picture as the first chroma block and is determined on a chroma block-by-chroma block basis.

13. The device of claim 8, wherein to determine the first residual block based on the first quantization parameter, the processing circuitry is configured to:
   inverse-quantize a plurality of coefficient values based on the first quantization parameter to generate inverse-quantized coefficient values; and
   inverse-transform the inverse-quantized coefficient values to generate the first residual block.

14. The device of claim 8, wherein to reconstruct the first chroma block, the processing circuitry is configured to:
   determine a prediction block for the first chroma block; and
   add the first residual block to the prediction block to reconstruct the first chroma block.

15. The device of claim 8, comprising a display configured to display decoded video data.

16. The device of claim 8, wherein the device comprises one of a camera, a computer, a wireless communication device, a broadcast receiver device, or a set-top box.

17. A non-transitory computer-readable storage medium storing instructions thereon that when executed cause one or more processors of a device for decoding video data to:
   determine a quantization parameter predictor for a first chroma block of a first chroma component and a second chroma block of a second chroma component of the video data based on a quantization parameter for a corresponding luma block;
   determine a first block level quantization parameter offset, for the first chroma block, from an index into a first list of quantization parameter offsets for the first chroma component;
   determine a first quantization parameter for the first chroma block based on the first block level quantization parameter offset and the quantization parameter predictor;
   determine a first residual block based on the first quantization parameter;
   reconstruct the first chroma block based on the first residual block;
   determine a second block level quantization parameter offset, for the second chroma block, from the index into a second list of quantization parameter offsets for the second chroma component, wherein the index into the first list of quantization parameter offsets is same as the index into the second list of quantization parameter offsets;
   determine a second quantization parameter for the second chroma block based on the second block level quantization parameter offset and the quantization parameter predictor;
   determine a second residual block based on the second quantization parameter; and
   reconstruct the second chroma block based on the second residual block.

18. The non-transitory computer-readable storage medium of claim 17, wherein the instructions that cause the one or more processors to determine the first block level quantization parameter offset comprise instructions that cause the one or more processors to:
   construct the first list of quantization parameter offsets;
   receive the index into the first list of quantization parameter offsets; and
   determine the first block level quantization parameter offset based on the index into the first list of quantization parameter offsets.

19. The non-transitory computer-readable storage medium of claim 17, further comprising instructions that cause the one or more processors to:
   receive at least one of a first quantization parameter offset for the first chroma component in a picture parameter set or a second quantization parameter offset for the first chroma component in a slice parameter set,
   wherein the instructions that cause the one or more processors to determine the first quantization parameter for the first chroma block comprise instructions that cause the one or more processors to determine the first quantization parameter for the first chroma block based on the first block level quantization parameter offset, at least one of the first quantization parameter offset or the second quantization parameter offset, and the quantization parameter predictor.

20. A device for decoding video data, the device comprising:
   means for determining a quantization parameter predictor for a first chroma block of a first chroma component and a second chroma block of a second chroma component of the video data based on a quantization parameter for a corresponding luma block;
   means for determining a first block level quantization parameter offset for the chroma block, from an index into a first list of quantization parameter offsets for the first chroma component;
   means for determining a first quantization parameter for the first chroma block based on the first block level quantization parameter offset and the quantization parameter predictor;
   means for determining a first residual block based on the first quantization parameter;
   means for reconstructing the first chroma block based on the first residual block;
   means for determining a second block level quantization parameter offset, for the second chroma block, from the index into a second list of quantization parameter offsets for the second chroma component, wherein the index into the first list of quantization parameter offsets is same as the index into the second list of quantization parameter offsets;
   means for determining a second quantization parameter for the second chroma block based on the second block level quantization parameter offset and the quantization parameter predictor;
   means for determining a second residual block based on the second quantization parameter; and
   means for reconstructing the second chroma block based on the second residual block.

21. The device of claim 20, wherein the means for determining the first block level quantization parameter offset comprises:
   means for constructing the first list of quantization parameter offsets;
   means for receiving the index into the first list of quantization parameter offsets; and
   means for determining the first block level quantization parameter offset based on the index into the first list of quantization parameter offsets.

22. The device of claim 20, further comprising:
means for receiving at least one of a first quantization parameter offset for the first chroma component in a picture parameter set or a second quantization parameter offset for the first chroma component in a slice parameter set,
wherein the means for determining the first quantization parameter for the first chroma block comprises means for determining the first quantization parameter for the first chroma block based on the first block level quantization parameter offset, at least one of the first quantization parameter offset or the second quantization parameter offset, and the quantization parameter predictor.

23. The device of claim 20, further comprising:
means for receiving a syntax element indicating that use of block level quantization parameter offsets is enabled,
wherein the means for determining the first block level quantization parameter offset for the first chroma block comprises means for determining the first block level quantization parameter offset based on the syntax element indicating that the use of block level quantization parameter offsets is enabled.

24. A method of encoding video data, the method comprising:
determining a quantization parameter predictor for a first chroma block of a first chroma component and a second chroma block of a seconc chroma component of the video data based on a quantization parameter for a corresponding luma block;
determining a first block level quantization parameter offset for the chroma block wherein an index into a first list of quantization parameter offsets for the first chroma component identifies the first block level quantization parameter offset;
determining a first quantization parameter for the first chroma block based on the first block level quantization parameter offset and the quantization parameter predictor;
quantizing coefficient values for a first residual block based on the first quantization parameter for the first chroma block;
signaling information indicative of the quantized coefficient values for the first chroma block;
determining a second block level quantization parameter offset, for the second chroma block, wherien an index into a second list of quantization parameter offsets for the second chroma component identifies the second block level quantization parameter offset and is same as the index into the first list of quantization parameter offsets;
determining a second quantization parameter for the second chroma block based on the second block level quantization parameter offset and the quantization parameter predictor;
quantizing coefficient values for a second residual block based on the second quantization parameter; and
signaling information indicative of the quantized coefficient values for the second residual block.

25. The method of claim 24, further comprising:
constructing the first list of quantization parameter offsets;
determining the index into the first list of quantization parameter offsets for the first block level quantization parameter offset; and
signaling information indicative of the index.

26. The method of claim 24, further comprising:
signaling at least one of a first quantization parameter offset for the first chroma component in a picture parameter set or a second quantization parameter offset for the first chroma component in a slice parameter set,
wherein determining the first quantization parameter for the first chroma block comprises determining the first quantization parameter for the first chroma block based on the first block level quantization parameter offset, at least one of the first quantization parameter offset or the second quantization parameter offset, and the quantization parameter predictor.

27. The method of claim 24, further comprising:
signaling a syntax element indicating that the use of block level quantization parameter offsets is enabled.

28. A device for encoding video data, the device comprising:
memory configured to store a quantization parameter for a corresponding luma block of a first chroma block of a first chroma component and a second chroma block of a second chroma component of the video data; and
processing circuitry coupled to the memory and configured to:
determine a quantization parameter predictor for the first chroma block and the second chroma block of the video data based on the quantization parameter for the corresponding luma block;
determine a first block level quantization parameter offset for the first chroma block, wherein an index into a first list of quantization parameter offsets for the first chroma component identifies the first block level quantization parameter offset;
determine a first quantization parameter for the first chroma block based on the first block level quantization parameter offset and the quantization parameter predictor;
quantize coefficient values for a first residual block based on the first quantization parameter for the first chroma block;
signal information indicative of the quantized coefficient values for the first chroma block;
determine a second block level quantization parameter offset, for the second chroma block, wherien an index into a second list of quantization parameter offsets for the second chroma component identifies the second block level quantization parameter offset and is same as the index into the first list of quantization parameter offsets;
determine a second quantization parameter for the second chroma block based on the second block level quantization parameter offset and the same quantization parameter predictor;
quantize coefficient values for a second residual block based on the second quantization parameter; and
signal information indicative of the quantized coefficient values for the second residual block.

29. The device of claim 28, wherein the processing circuitry is configured to:
construct the first list of quantization parameter offsets;
determine the index into the first list of quantization parameter offsets for the first block level quantization parameter offset; and
signal information indicative of the index.

30. The device of claim 28, wherein the processing circuitry is configured to:
signal at least one of a first quantization parameter offset for the first chroma component in a picture parameter set or a second quantization parameter offset for the first chroma component in a slice parameter set, wherein to determine the first quantization parameter for the first chroma block, the processing circuitry is configured to determine the first quantization parameter for the first chroma block based on the first block level quantization parameter offset, at least one of the first quantization parameter offset or the second quantization parameter offset, and the quantization parameter predictor.

31. The device of claim 28, wherein the processing circuitry is configured to:

signal a syntax element indicating that the use of block level quantization parameter offsets is enabled.

* * * * *